United States Patent [19]

Apitz

[11] Patent Number: 5,231,493
[45] Date of Patent: Jul. 27, 1993

[54] VIDEO RECEIVER WITH PERMANENT ELECTRONIC PROGRAM JOURNAL

[75] Inventor: Siegfried Apitz, Pforzheim, Fed. Rep. of Germany

[73] Assignee: Nokia (Deutschland) (GmbH), Pforzheim, Fed. Rep. of Germany

[21] Appl. No.: 467,727

[22] Filed: Jan. 18, 1990

[30] Foreign Application Priority Data

Jan. 21, 1989 [DE] Fed. Rep. of Germany ....... 3901785
Aug. 25, 1989 [DE] Fed. Rep. of Germany ....... 3928175

[51] Int. Cl.$^5$ .............................................. H04N 7/04
[52] U.S. Cl. .................... 358/146; 358/147; 358/191.1
[58] Field of Search ............ 358/142, 146, 147, 188, 358/191.1, 335

[56] References Cited

U.S. PATENT DOCUMENTS

| | | | |
|---|---|---|---|
| 4,894,714 | 1/1990 | Christis | 358/191.1 X |
| 4,897,727 | 1/1990 | Richards | 358/188 X |
| 4,908,707 | 3/1990 | Kinghorn | 358/191.1 X |
| 4,977,455 | 12/1990 | Young | 358/142 |
| 4,992,871 | 2/1991 | Bensch et al. | 358/142 |
| 5,038,211 | 8/1991 | Hallenbeck | 358/146 X |

FOREIGN PATENT DOCUMENTS

| | | |
|---|---|---|
| 0096381 | 12/1983 | European Pat. Off. . |
| 0253110 | 1/1988 | European Pat. Off. . |
| 3527939 | 2/1987 | Fed. Rep. of Germany . |
| 3621263 | 1/1988 | Fed. Rep. of Germany . |
| 3623925 | 1/1988 | Fed. Rep. of Germany . |
| 3742468 | 10/1988 | Fed. Rep. of Germany . |

OTHER PUBLICATIONS

IEEE Transactions on Consumer Electronics, "1988 International Conference on Consumer Electronics, part 1", Band 34 Nr. 3, Aug. 1988, Seiten 788-792, New York, N.Y., US; U. Bensch: "VPV—videotext programs videorecorder" *Das ganze Artikel*.
Rundfunktechnische Mitteilungen (RTM), Band 30, Nr. 5, Sep.-Oct. 1986, Seiten 223-229, Norderstedt, DE; G. Eitz et al.: "Videoheimgerate (VPV)" *Bilder 3-17; Seiten 228-229*.
IEE 1988 International Conference on Consumer Electronics, Digest of Technical Papers, Jun. 8-10, 1988, Rosemont, Illinois, Seiten 288-299, IEE, New York, US; G. Zeisel et al. "An interaction menu-driven remote control unit for TV receivers and VCR-recorders".
Elektronik, Band 34, Nr. 12,4. Jun. 1985, Seiten 1673-168—Munchen, DE; U. Wildhagen "Teletext-Multi-Page-System".
English Language Abstracts.
Patent Abstracts of Japan.
Rundfunktechnische Mitteilungen, Band 31, Nr. 2, Mar.-Apr. 1987 Seiten 83-93, Norderstedt, DE; G. Eitz et al: "Top—ein Verfahren zur Vereinfachten Anwahl von Fernsehtext-Tafeln durch den Zuschauer".

*Primary Examiner*—Victor R. Kostak
*Attorney, Agent, or Firm*—Ware, Fressola, Van Der Sluys & Adolphson

[57] ABSTRACT

A video receiver is provided having a screen forecast journal with teletext data, collected from different broadcast stations and continuously updated with text pages at preset time intervals. The data is arranged in tables by programme identification and page identification and stored in memory devices, for accessing at any time. The page identifications are allocated to the programme slots, i.e. one programme identification with a page number each time. The tables can be accessed by page numbers for programmes not being transmitted at that time. A programme identification/page identification table proves beneficial for programming such page identifications. Pages are referenced by moving a cursor to margin areas of a text page. All programmes in the same time period can be paged through. Telecasts to be recorded can be selected from the pages of the forecast journal. Telecast data is transferred on a timer memory device. In this memory device, telecasts are marked (flagged) as soon as they are recorded completely. Either only flagged or only unflagged broadcasts can be displayed. A timer table can show marked (recorded) and/or unmarked (not yet recorded) telecasts, to function as a video library, which can also show the information, regarding which cassette contains the individual telecast previously recorded. In addition to the recording data, and cassette number information, the system is also capable of copying the individual telecast titles from the forecast page, and entering them into the video library, for ease of identification for later replay purposes.

13 Claims, 17 Drawing Sheets

| 1 | 2 | 3 | . | . . . | N |
|---|---|---|---|---|---|
| Name 1 | Name 2 | Name 3 | | . . . | |
| ChannelK1 | ChannelK2 | ChannelK3 | | . . . | |
| 101 102 305 | 100 103 | (No text pages in this program) | | | |

| 1 | 2 | 3 | 4 | . . . | N |
|---|---|---|---|---|---|
| Name 1 | Name 2 | Name 3 | Name 4 | | Name N |
| ChannelK1 | ChannelK2 | ChannelK3 | — | | |
| Name 1/101 Name 1/102 Name 1/305 | Name 2/100 Name 2/103 | Name 1/341 Name 2/345 | Name 1/510 Name 2/510 Name 5/510 | | |

PROGRAM IDENTIFICATION/
PAGE IDENTIFICATION MEMORY UNIT

| Name 1 | Name 1/101 | 0000-1200 |
| Name 1 | Name 1/102 | 1200-1959 |
| Name 1 | Name 1/305 | 2000-2359 |
| Name 2 | Name 2/100 | 0000-2359 |
| Name 2 | Name 2/103 | 2000-2359 |
| Name 3 | Name 1/341 | 1500-1759 |
| Name 3 | Name 2/345 | 1600-2059 |
| Name 4 | Name 1/510 | ——— |
| Name 4 | Name 2/510 | ——— |
| Name 4 | Name 5/510 | ——— |

PROGRAM
IDENTIFICATION

PAGE IDENTIFICATION

CLOCK TIME

Fig. 6

| Name 1/110 |
| Name 2/110 |
| Name 5/110 |
| Name 6/110 |
| Name 1/150 |
| Name 2/150 |
| Name 5/150 |
| Name 7/150 |

SPECIAL LIST
or
PAGE IDENTIFICATION LIST

| 5 | |
|---|---|
| NAME 5 | |
| CHANNEL K5 | |
| NAME 5/301 | H |
| NAME 5/302 | H |
| NAME 5/303 | H |
| NAME 5/401 | F1 |
| NAME 5/403 | F2 | W1
| NAME 5/405 | | W2
| NAME 5/407 | |
| NAME 5/409 | |
| NAME 5/411 | |
| NAME 5/413 | |

VIDEO RECEIVER WITH PERMANENT ELECTRONIC PROGRAM JOURNAL

The invention relates to a video receiver, i.e. specifically a television receiver or a video cassette recorder. Such devices can receive TV signals in several programmes. Different programmes are generally broadcast on different channels (different frequency bands). Every programme generally transmits a large number of broadcasts daily.

The TV signals do not only contain picture signals for broadcasts, but also frequently text signals for a data service which is called teletext or videotext. The broadcast text pages may contain data relating to broadcasts. In the following, such pages are called broadcast pages. Other pages are called data pages; these include, for example, pages containing information on the weather, stock market prices, special offers relating to certain articles, etc. In the following, the term "page" basically means the amount of text information which is shown each time on a screen page. In practice, screen frames are sometimes broadcast which extend over several pages. Every page carries the same number. If such a page number is called up repeatedly, the various pages of the multipage frame are displayed consecutively.

Each different programme often uses the same pages, but this does not necessarily mean that pages with the same numbering contain identical information. For example, a page numbered 300 in a programme may give an overview of the broadcasts during one day whereas another programme with the same page number transmits information on the weather.

It is therefore necessary, whenever specific information is required, to stipulate both the page number and the programme from which the required page is to be received.

STATE OF THE ART

If a specific text page is to be displayed by a video receiver on a screen, a programme slot according to the state of the art must first be selected, i.e. the slot which applies to the programme from which the page to be displayed is to be received. Two options are available for the subsequent process. The first option is that the desired page for each display is entered manually. The second option is that the video receiver notes several page numbers which a user enters in a programme slot. If the same programme slot is then used again later, the desired page numbers first appear in a footer. The user can then select one of the entered numbers. A video receiver of the last-mentioned type is described in "Funkschau" 6/1985, pages 53 tc 56. This unit does not only store page numbers, but also the contents of several text pages. As soon as a programme slot is selected, the unit tuner is tuned by the control device itself to the frequency assigned to this programme. Information regarding the desired page numbers is supplied to a text decoder. This separates the desired pages from the received TV signal and transfers them to the page memory. The advantage of this is that, while the first received page is being viewed, other pages are already being searched with the result that a subsequent page is normally available immediately after switchover to a subsequent page. It is only then, when a switchover is made to a new programme, that a waiting period occurs until a first page with a preset number is extracted again from the TV signal.

It is also known that requests for broadcasts to be recorded can be taken over directly from a broadcast page when it is displayed on a screen. In this case, the line containing the desired broadcast is moved by means of a cursor and the information in the line is then transmitted to a broadcast memory by pressing a specified key. The information includes the date and the starting time of the broadcast. The device has another operation in which a timer monitors whether the starting time of the broadcast has been reached. As soon as this occurs, the device, in this case a video cassette recorder, is switched to the record mode. The starting time of the broadcast is therefore the moment at which a VPS (Video Programming System) signal is transmitted which corresponds to the predetermined start time of the broadcast. Recording finishes as soon as the corresponding VPS signal is no longer transmitted. The unit then switches back to a stand-by mode.

A broadcast request can also be input manually in the broadcast memory. If this involves a broadcast which is not transmitted with VPS signals, both the starting time and the finishing time of the broadcast must be entered. If there are no VPS signals, recording begins at the programmed starting time, even if the desired broadcast has not yet actually begun. Recording ends at the preset finishing time, even if the broadcast is still running.

The contents of the broadcast memory are displayed on a screen. The majority of video receivers ensure that a memory input for a broadcast is erased as soon as it has been recorded. Other video receivers provide broadcast data for recorded broadcasts by means of a flag.

The input of flagged broadcast data can be erased by operating the unit accordingly.

There are numerous operating difficulties relating to the abovementioned functions of video receivers which is why efforts are continually being made to improve the user friendliness of such video receivers.

DESCRIPTION OF THE INVENTION

This application contains a group of inventions which are connected to one another in that they realise the idea of improving the user friendliness of video receivers. Overall, it involves eight inventions independent of each other as regards their concepts which can be used in any combination, or all together. Each invention includes extensions which stipulate the compulsory use of at least one of the other inventions. A first subgroup of inventions is concerned with finding text pages, a second with displaying text pages and a third with handling recorded broadcasts. Broadcast data relating to a recorded broadcast can always then be stored very easily if text pages are available in accordance with an invention from the first subgroup. The particularly advantageous display of text pages, according to the second subgroup of inventions, is also dependent on the fact that text pages have been acquired in accordance with an invention from the first subgroup.

There now follows a brief description of the effects of all eight inventions. The function groups, as listed in the claims, are not repeated in detail in this brief account as they are explained in full in the subsequent description of working examples.

The video receiver corresponding to the first invention updates text pages independently, e.g. by the fact that an updating programme run is started either at predetermined intervals or at predetermined times. The identification of the updated pages, i.e. a relevant programme identification and a relevant page number, was first stored in a memory device. The updating programme processes one page identification after another, drives the unit tuner according to the programme identification and the text decoder according to the page number, and stores each text page retrieved from the received TV signal in a page memory. Line-by-line processing is the preferred method because then several lines are retrieved consecutively, but the text decoder is updated at the same time with several page numbers relating to each programme. The advantage of this invention lies in the fact that quite up-to-date video text information is accessible at any time of the day, even if no TV signals or at least no TV signals containing text information are being transmitted. A further advantage is that text information can also be called up when the unit is operating in a mode for which the tuner has been set to a fixed frequency. A broadcast can thus be viewed on the screen of a TV, while at the same time video text can be called up in a section of the screen, i.e. programmes which are being broadcast at a frequency different to the tuner frequency during viewing. In the case of VCRs, a broadcast can be recorded and videotext viewed at the same time on a screen. The user can transmit broadcast data from the displayed broadcast page information to his broadcast memory. With known devices of this type, only manual input into the broadcast memory was possible in the record mode, since videotext was not freely accessible as the tuner has to be kept at a preset frequency during recording.

With the second invention, text pages for each programme slot can be displayed even though they are not being transmitted by the programme which is assigned to the respective programme slot. This is made possible by the fact that for a programme slot, not only one page number is stored or several page numbers are stored, but also by the fact that for each page number the programme identification for the programme transmitting the desired page is stored simultaneously. This invention is of benefit, e.g. in the following cases. Various programmes do not transmit any text data and thus no broadcast pages relating to the programme either; however, other programmes transmit broadcast pages relating to such a programme. With previous video receivers, it was not possible to receive broadcast pages relating to such a programme in the programme slot for such a programme. On the contrary, it was necessary to switch over to the programme which was transmitting broadcast pages relating to the programme in question and search for the pages there relating to the actual programme. In the second invention, however, it is now possible to display for every programme slot all broadcast pages relating to the programme in question, even if the broadcast pages are being transmitted by other programmes. As already mentioned, this is made possible by the fact that for each programme slot not only page numbers are stored but also page numbers with programme identifications. Another advantage of the second invention is that subjects can be assigned to programme slots. Thus, for example, text pages can be placed in programme slots which are each assigned to a specific subject, e.g. the weather or stockmarket information. The page information assigned to these programme slots comprises all programme identifications and page numbers which relate to the individual subject.

Instead of selecting a programme slot, a subject list of this type can also be created and read by selecting a specific menu item.

The third invention refers to a programme identification/page identification table which stores at least one page identification allocated to one of several programme identifications in each case whereby every page identification consists of a programme identification and a page number. This table can then be used, for example, when it has to be stipulated what pages are to be inserted into the current updating table or a programme slot. The table is then displayed on a screen and the desired pages are selected from the table by means of a cursor. A table of this type can list hundreds of pages. The pages which can be input do not then have to be laboriously picked out from text overview frames and entered by hand. Such a table is also of assistance when, in the case of programme runs, allocations have to be made between page identifications and programme slots. As already mentioned, information in a specific programme with a specific page number may contain exclusively broadcast information relating to another programme. The above-mentioned table checks directly what page belongs to what programme. If the table is supplemented by times which show what time spans cover specific pages, it is also possible to ascertain retrospectively the identification of broadcasts, and in particular their title, if such a broadcast was recorded without having first been identified and stored in a broadcast memory.

The fourth invention refers to a specific type of page control using a cursor. A cursor can normally be moved from line to line on a page. If a switch is to be made to a following or previous page or to a following or previous programme, specific commands must be entered.

The video receiver corresponding to the invention now ensures that every text page is surrounded by a margin on all four pages. If the cursor is moved down to the lower margin and a key is then pressed which is also used to jump from line to line, a switchover is made to the following page of the same programme. Accordingly, when the upper margin is reached, a switchover is made to the previous page; when the right margin is reached, a switchover is made to the next programme and when the left margin is reached to the previous programme. A change in the margin allocation can also be selected differently.

The fifth invention refers to a video receiver which displays a page stipulated in a specific way as the first page during switchover from one programme to another in text page display. In original devices, the first page stipulated for the relevant programme was always displayed as the first page. The video receiver corresponding to the invention, however, shows as the first page the one which relates temporarily to the time at which the cursor was positioned in the previous page. Thus, if a user views for example a page for the evening programme in a first programme, and then switches the display of broadcast pages to another programme, the page for the evening programme will also be displayed as the first page. A user can thus page through all programmes within a desired time period. If he comes across a programme which does not contain a page with the desired time span, this page will be displayed as the first one covering the following time span. If no such page exists, the first page of the list relating to the corresponding programme is displayed. However, these latter variations do not make any changes to the set period.

This is only changed if the cursor is moved from one line to the next within a page. Every time a new line is reached, the clock time relating to the broadcast in this line is fixed as the clock time which determines the search for pages in other programmes.

This invention then has specially beneficial uses when a continually updated page memory is available. In this case, an individual programme or several programmes can be paged without any waiting time in the pages.

The sixth invention relates to a video receiver designed as a VCR which is capable of processing flags in a specific way, such flags being placed in a conventional way at broadcast data belonging to recorded broadcasts in a broadcast memory. Conventional video receivers display the entire contents of the broadcast memory on a screen. The actual display is very unclear. The unclearness is also not improved very much when attempts are made with the aid of flags and highlights to catch the eye of the user. The video receiver, corresponding to the invention, makes it possible to display either flagged or unflagged broadcast data on a screen. If a menu item "broadcasts to be recorded" is selected, the user sees on screen immediately a complete and final overview of all broadcasts still to be recorded without any distracting additional information on broadcasts already recorded also being displayed. The same is true of the display of data in a menu item "display recorded broadcasts". It is particularly advantageous to make the output of flagged broadcasts dependent on a cassette code. This permits very clear cassette management. If a cassette is inserted into the tape device, either a cassette code is read automatically or one, e.g. a cassette number, is entered manually. The video receiver then searches in the broadcast memory device for flagged broadcast data relating to this cassette code and only displays this data.

The broadcast data for recorded broadcasts is stored permanently in the broadcast memory device. As a result of this, the user can recognise immediately the contents of all coded cassettes as soon as the user puts the cassette in the tape device, enters the code and calls up the corresponding menu item for displaying the contents of the cassette. If this cassette code is not stored, flagged broadcast data is erased preferably, i.e. data relating to recorded broadcasts as soon as a new cassette in inserted into the tape device. When the previous cassette is removed, its contents and therefore the display are retained on screen, so that a user can note on the cassette broadcast data regarding recorded broadcasts from the screen.

The seventh invention ensures that broadcast data relating to a recorded broadcast is transferred automatically to the broadcast memory device if such information has not already been entered before the recording of a broadcast. This happens when a user records a broadcast without preprogramming, e.g. if, in the course of a current broadcast, he realises that he would like to record it and presses the record button accordingly. As soon as the recording has ended, the video receiver searches for an entry in the broadcast memory device on which a flag is now to be placed. If no such entry exists, the device traces the relevant broadcast data from broadcast pages with the aid of the VPS signal transmitted and stored during the broadcast and transfers this data with a flag to the broadcast memory device. If the broadcast does not transmit any VPS signals, the device searches in text pages for broadcast data which relate to the programme in question for the beginning of the recording. If this data is found, it is transferred to the broadcast memory device.

The location of broadcast pages with relevant information is then particularly simple if text pages can be accessed such as those updated, according to invention 1. However, a broadcast may have been recorded without the relevant data being contained in an updated page. In this case, a table containing additional time information, as per invention 3, provides further assistance. With this table, the related page identification can be traced by means of the recording time. The corresponding page is then searched, read and analysed by setting the tuner and text decoder accordingly.

The eighth invention ensures that preview pages can also be found when they are not permanently numbered, i.e., for example, when a page for the programme tomorrow cannot always be found under the number 301, but under a number which changes daily, e.g., under the number when the following day is the first day of a month, under the number 302, when the following day is the second day of the month, etc. According to this invention, not only page numbers are stored, but a preview memory device also stores the number of preview days for which pages are to be read in. The entry, therefore, is, for example, that preview pages are to be found under pages 301 to 331 and that from these 31 pages two are to be searched which contain the preview for tomorrow or the day after. In order to avoid a daily search of all pages available for selection, it is an advantage if the device recognises the sequence code according to which preview pages can be found, i.e. for example the above-mentioned monthly sequence code or a weekly sequence code or a fixed allocation in which the page for tomorrow or the day after is always found under a permanent number.

It is particularly beneficial to develop the unit so that it has a learning device which tries to find a preview page according to one of several sequence codes and which varies the sequence code as long as it always finds preview pages immediately under a located sequence code. This invention is very useful in updating an extensive page memory. However, the invention can also be used independently of all other inventions described here.

BRIEF DESCRIPTION OF THE FIGURES

FIG. 6—Display of the contents of a separate programme identification/page identification memory device;

FIG. 7—Display of the contents of a special list or a page identification list;

FIG. 23—Display of the contents of a programme slot memory area corresponding to the contents of the programme slot memory as per FIG. 5 with the additional indication of a sequence code behind each page identification.

METHODS OF PERFORMING THE INVENTION

Figure 1:
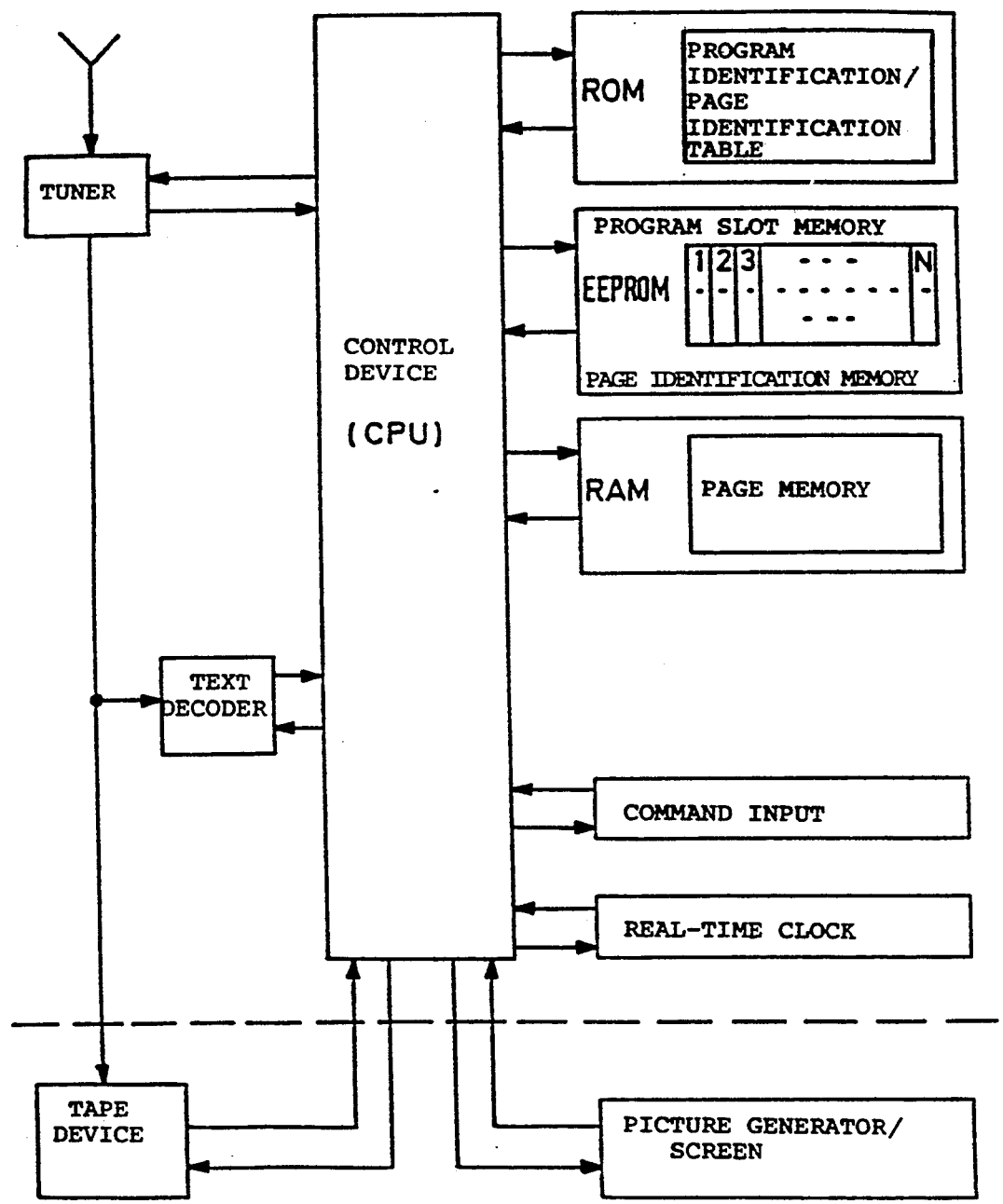
FIG. 1—Block diagram of a video receiver which works in conjunction with a screen and/or a tape device.

The block diagram in FIG. 1 is split by a horizontal dotted line. The blocks above the dotted line form a video receiver. However, the block marked "Command input" does not necessarily belong to this receiver. The command input can be produced by a keyboard on the video receiver in which case it is part of the receiver, or it can be designed as a remote control unit, i.e. as a separate device. Underneath the dotted line, there is a block for a tape device and a block for a picture generator/screen. A video receiver, which is housed in a casing together with a tape device, forms a VCR. A video receiver, which is housed in a casing together with a screen, forms a television set.

The video receiver in FIG. 1 features a tuner, a text decoder, a ROM, an EEPROM, a RAM, a real-time clock and a control device (CPU), which controls the operational cycle of all these function groups through the exchange of control, address and data signals.

In the three memory blocks shown in FIG. 1, memory areas are highlighted, i.e. a programme identification/page identification table in the ROM, a programme page memory and a page identification memory in the EEPROM and a page memory in the RAM. With the exception of the programme page memory, these memory areas are involved in the storage of text pages.

If the video receiver does not have a text decoder, all memory capacities relating to text information access and storage are deleted. In the following description, special reference is made to this fact through working examples which function without a text decoder.

Figure 2:
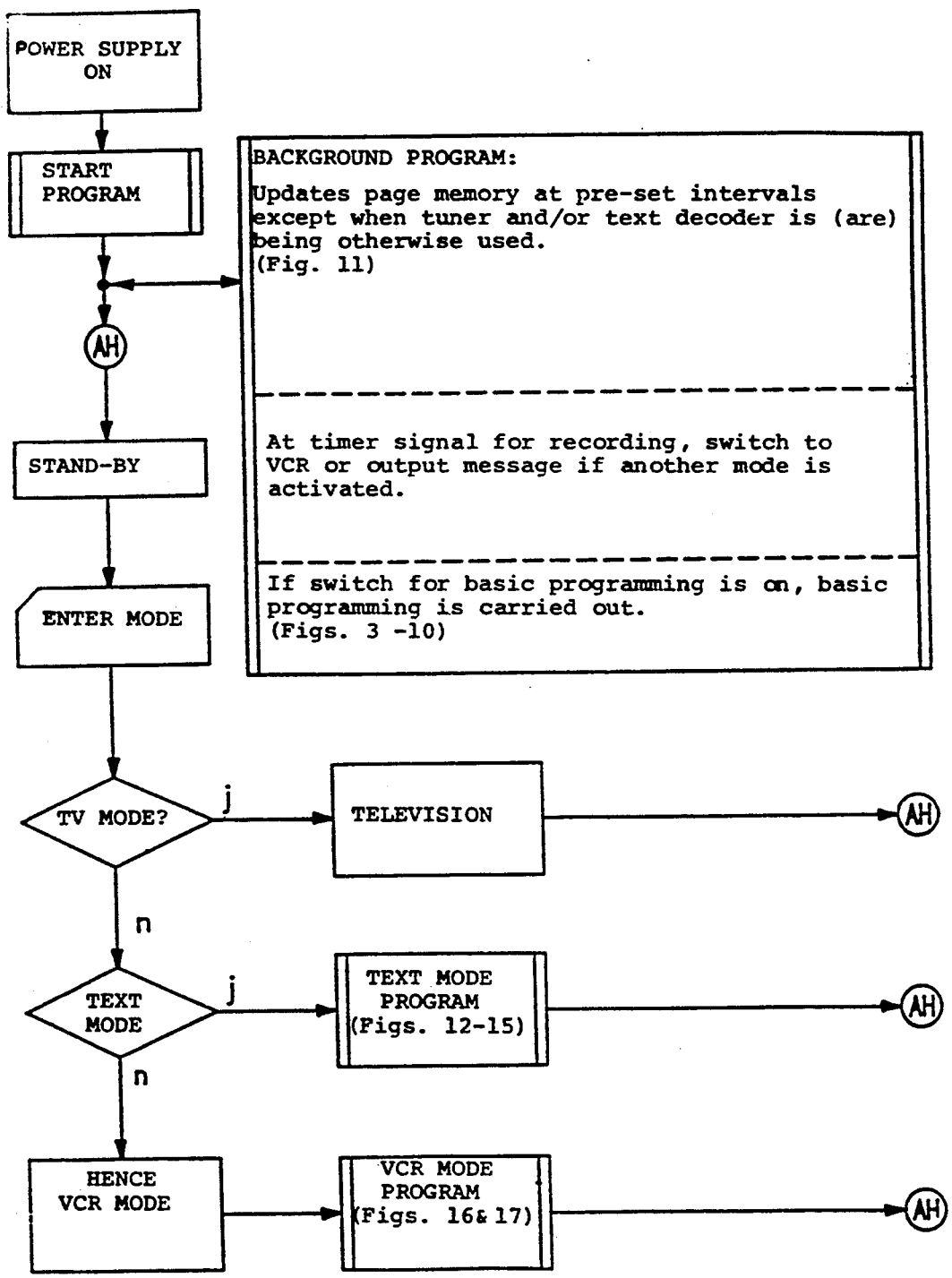
FIG. 2—Main flowchart for a video receiver corresponding to FIG. 1, when it is designed as a VCR.

FIG. 2 shows the main program run for a VCR. As soon as voltage is applied to the unit, either by connecting the mains plug to the power supply or by connecting a supply battery, a start program commences. As soon as it finishes, processing of an updating program begins which ensures that text pages, as they are received via the text decoder, are continually updated. How this actually works, is explained below in more detail on the basis of FIG. 11. The updating program runs continually in the background apart from when the tuner and/or the text decoder are otherwise occupied. If there is a separate tuner for updating, updating can also be carried out when, with the aid of a main tuner, a TV programme is received for viewing or recording. Apart from the updating program, a timer monitoring program runs continually in the background. This program checks whether a time has been reached from which a broadcast is to be recorded. If this is the case, the device switches automatically, provided it is not being operated right at that moment by the user, to a VCR mode in which recording is carried out. If the user is just operating the unit in another capacity, a message is displayed to indicate that the starting time of a broadcast to be recorded has been reached.

Finally, a continuous background check monitors whether a switch for basic programming has been switched on. If this is the case, a basic programming menu is displayed whose function is explained in more detail below on the basis of FIGS. 3 to 10.

As soon as the start program has ended and the background program has also started, the unit switches to a stand-by mode. Before the corresponding block in FIG. 2 there is a flag AH via which the stand-by mode is always reached from other modes. In the case of the device corresponding to the preferred working example, three different modes can be selected by pressing one of three keys which are marked "TV", "T" or "VCR". With these keys, either a TV mode, a text mode or the previously mentioned VCR mode is set. If the TV mode is selected, a TV programme can be viewed. If the TV is switched off, while the VCR to which the sequence in FIG. 2 applies, is in the TV mode, the recorder returns to the stand-by mode. However, if one of the two other mode keys is pressed, a corresponding switchover is made. In the text mode, a text mode program starts which is explained in more detail below on the basis of FIGS. 12 to 15. In the VCR mode, a VCR mode program starts which is illustrated by means of FIGS. 16 and 17. If at least 5 minutes have elapsed in the text mode program or the VCR program since the last command processed, the recorder returns to the stand-by mode. A switchover to another mode can also be made at any time by pressing one of the mode keys.

A flowchart for a TV set is very similar to that for a VCR corresponding to FIG. 2. The only feature missing is in fact the VCR mode.

Basic programming is required for every video receiver irrespective of whether it is designed with a built-in tape device as a VCR or with a built-in screen as a TV set. Video receivers are therefore capable of receiving a large number of preset programmes with the aid of an adjustable tuner.

It is defined in the basic programming what programmes can be received with each device without the need for manual adjustment of the tuner. A programme slot memory stores the receive frequency for each programme.

Figure 3:
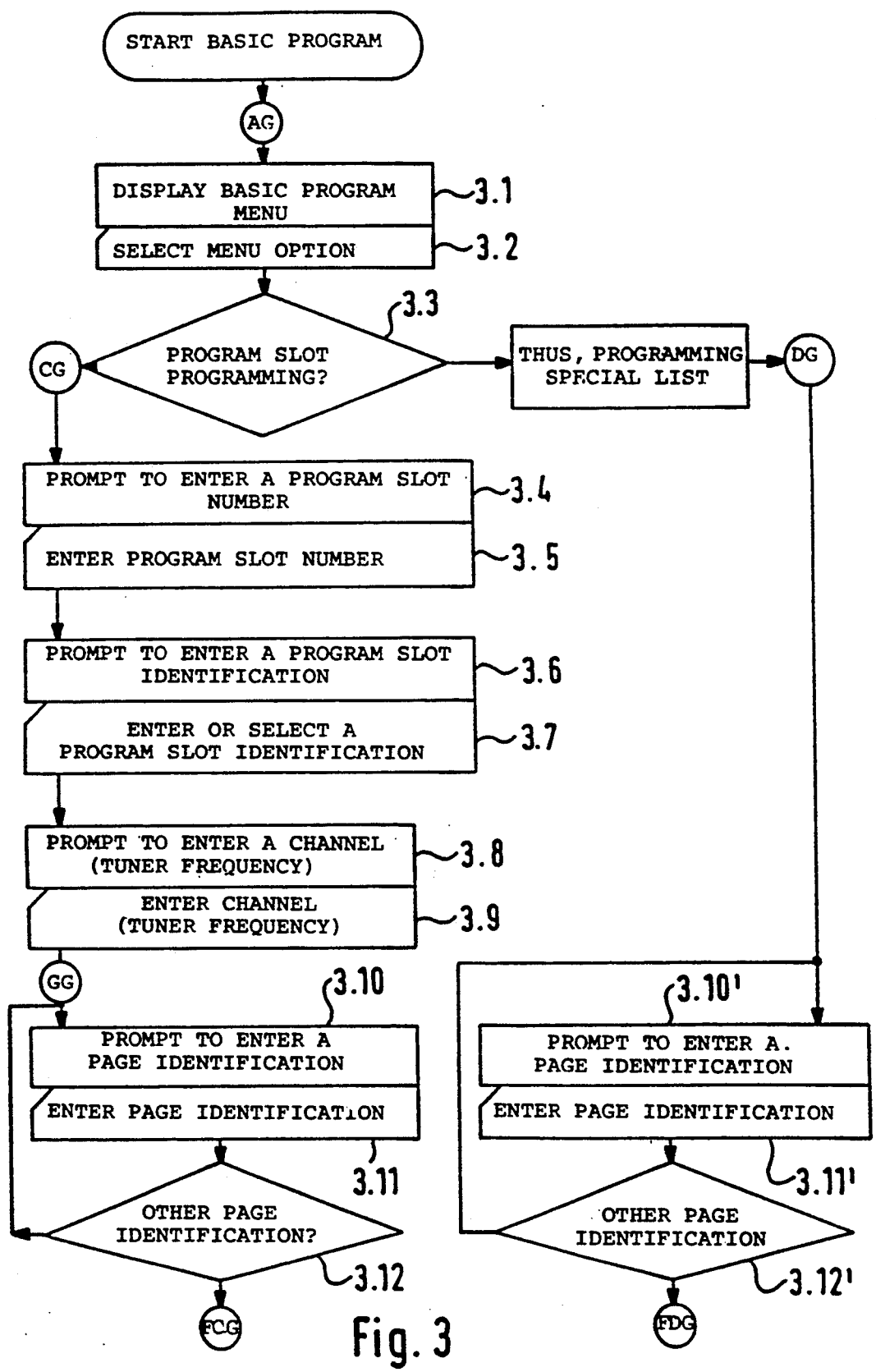
FIG. 3—Flowchart relating to the subprogram "basic programming" in the flowchart referred to in FIG. 2.

The basic programming program in FIG. 3 starts whenever the previously mentioned basic programming switch is switched on. It ends at any position in the program run as soon as the above-mentioned switch is switched off. A step 3.1, in which a basic programming menu is displayed, is attained via a flag AG which is reverted to at the end of subsequences. A menu option is selected in a step 3.2.

The selection of menu options is described below. As already mentioned, the three basic modes are selected by means of three special keys. Other menu options are normally selected on video receivers by entering a number in a keyboard which is allocated to a desired menu option in the menu display on screen. However, menu options can also be selected by a special remote control unit described in a parallel patent application. This remote control unit establishes whether it was inclining forwards, backwards, to the left or to the right, or whether it is in a horizontal position. If a universal key is pressed, one of five codes, irrespective of the position of the unit, is emitted. Thus, a simple selection can be made between five different menu options by merely positioning the remote control unit accordingly and pressing the universal key. It is also possible to select a menu option due to the fact that, with the aid of two cursor keys for "Up" and "Down", the line can be moved which shows the desired menu option and then a selector key is pressed. The actual method of menu selection is irrelevant as far as the following remarks are concerned. The actual method of menu selection will therefore not be mentioned again.

As soon as a menu option is selected in the basic programming, a check is made (Step 3.3) whether a programme slot or a special list is to be programmed. If the program slot programming option is selected, a corresponding display on screen prompts the user to enter a programme slot number. It can now be established (Step 3.5) for which programme slot data can be entered. In modern video receivers, up to a few dozen programme slots can be entered. As soon as a number is defined, the user is prompted (Step 3.8) to enter a programme slot identification. A programme slot identification is not actually essential to operate a video receiver, but such identifications make it easier for the user to see what programmes he can switch over to by merely switching from one programme slot to another, without adjusting the tuner manually. The user can therefore display in a corresponding menu option the programme slot identifications for all programme slots. One advantage of the video receiver corresponding to the working example is that programme slots can not only be allocated to programmes as broadcast by stations, but also that broadcasts on a specific subject can be stored in programme slots irrespective of what programme is being broadcast. A program slot can therefore be designated, for example, as "ARD", "BBC", "NBC", but also, for example, as "Weather" or "Stock market". A program slot identification can be entered or selected and taken over from a proposed list. The latter option is explained below in further detail on the basis of FIGS. 8 to 10. As soon as the programme slot identification is entered or selected (Step 3.7) a request is made to enter a channel, i.e. a tuner frequency (3.8).

After entering the channel (Step 3.9), the user is prompted by the unit to enter a page identification (Step 3.10). The meaning of a page description and what input variations are possible are described in further detail below on the basis of FIGS. 4 to 7. After the page identification has been entered (3.11), a decision must be made as to whether another page identification is to be input. If so, Steps 3.10 to 3.12 are repeated for as long as new page identifications are to be entered. If it is ascertained in Step 3.12 that no further page identification is to be entered, Step 3.13. is taken in which the programme slot identification, the channel and the page identification for that programme slot are stored in a programme slot memory device which is allocated to the entered programme slot number. If it is ascertained in a subsequent step 3.14 that data is to be entered for a further programme slot, the sequence continues from Step 3.4. Otherwise, the programme run returns to the flag AG, i.e Step 3.1.

If it is ascertained in Step 3.3 that a special list is to be programmed, Steps 3.10' to 3.12' are taken which correspond entirely to Steps 3.10 to 3.12. In a subsequent step 13.13', however, the entered data is not stored allocated to a programme slot, but to a special list. This special list is used to store page identifications relating to specific subject areas. It therefore realises a function which is also possible via programme slot programming, as described in more detail above. It is normally clearer for the user to call up a special list or several special lists regarding to subject areas instead of programme slots. However, from the point of view of the internal functional sequence of questions within a video receiver it is irrelevant whether pages are displayed allocated to a specific programme slot or allocated to a so-called special list.

As already mentioned, a prompt is made in Steps 3.10 or 3.10' to enter a page identification. A page identification comprises a programme slot identification and a page number. Thus, for example, both the First and Second German Television Channels transmit broadcast information on a page each with the number 300, but for their own programme respectively. The page contents are therefore different. The programme identification is used to set the tuner to the corresponding programme and the page number is used to update the text decoder in such a way that it searches for the corresponding page in the broadcast text. So that the tuner can find the respective programme, it requires frequency data. For the sake of clarity, however, the following remarks always refer to a programme name by the term "programme identification". The control unit of the video receiver is therefore easily capable of converting names or numbers into frequencies. This is possible as all this data for each programme slot is stored in a common memory.

If, in Step 3.10, a prompt is made to enter a page number instead of a page identification and if such a name is entered accordingly in Step 3.11 instead of an identification, a basic programming run would be available as is already known with usual video receivers. There would then be a memory slot space assignment in the programme slot memory device such as the one shown in FIG. 4. In this case, for every programme slot number, the programme name, the relevant channel and the page numbers are entered for which pages are to be called up if the corresponding programme is set. A normal memory slot space assignment of this type can be easily used during automatic updating as explained in further detail below on the basis of FIG. 1. For other functions of the device, however, it is more advantageous to store page identifications instead of just page numbers. This is now explained in more detail.

Figures 3, 4, 5:
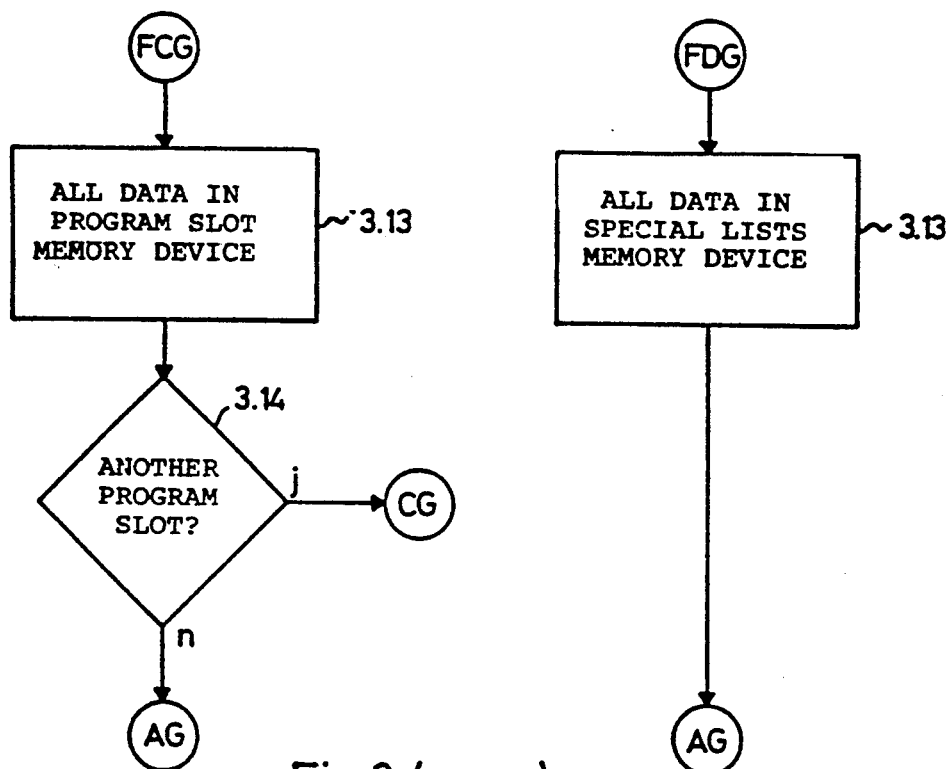
FIG. 4—Display of the contents of a programme slot memory which stores page numbers allocated to programme slots.
FIG. 5—Display of the contents of a programme slot memory which stores page identifications (page numbers and programme identifications) allocated to programme slots.

There are programmes which do not transmit any text, i.e. no broadcast pages which provide information regarding broadcasts on this programme. However, other programmes normally transmit broadcast pages regarding such No-Text Programmes. In FIG. 4 the assumption is made that the programme with No. 3 is a No-Text Programme. A user is therefore unable to store any page numbers relating to this programme. If he wants to view broadcast pages relating to this programme, he must enter the corresponding page numbers in another programme and call them up there.

This disadvantage is overcome if page numbers and page identifications allocated to each programme are stored, as shown in FIG. 5. It is assumed there that broadcast pages for programme No. 3 are to be found in programme 1 under page number 341 and in programme 2 under page number 345. In Step 3.11, the page identification "Name 1/341" and then "Name 2/345" are entered accordingly in the basic programming. If the user later selects in text mode a menu option for displaying text pages while he is in the third programme, he will be shown pages for the third programme, although this programme does not actually transmit any text pages. The tuner, however, is set to the first programme and then to the second programme and searches the pages with the specified numbers each time.

By means of programme 4 in FIG. 5, a case is illustrated in which a programme slot is allocated to a subject. Therefore, no programme channel is entered for the fourth programme slot. The page identifications entered are all those referring to a specific subject, e.g. the weather or the stock market. In the figure, it is assumed that these pages all have the same number in different programmes, but this may not necessarily be the case. In the case of assignment corresponding to FIG. 5 for the fourth programme, the pages bearing the number 510 are called up in each case in the first, second and fourth programmes.

The diagrams in FIGS. 4 and 5 relate to cases in which page names or page identifications are allocated directly to programme slots. However, a memory space assignment can also be easily made as illustrated in FIG. 6. This involves a continuous list containing the programme identifications and the page identifications as used in FIG. 5. In addition to this list, a programme slot memory is used which merely stores the programme slot number, the programme name and the related channel. The page identifications for all programmes are contained in the standard list in accordance with FIG. 6.

The list corresponding to FIG. 6 may also contain a column with times in addition to a column with programme identifications and a column with page identifications. A related input step should therefore be present in the basic programming run corresponding to FIG. 3 in order to fill the initially empty list with not only programme identifications and page identifications, but also with time information. The times relate to the time period which is covered by broadcast pages. If the broadcast identifications refer to general information pages, e.g. regarding the weather or the stock market, there are no time allocations, which is why the time column at the corresponding positions is empty. The times prove beneficial in an advantageous working variant for simply scrolling in pages in different programmes with a permanently identical time span.

Figure 11:
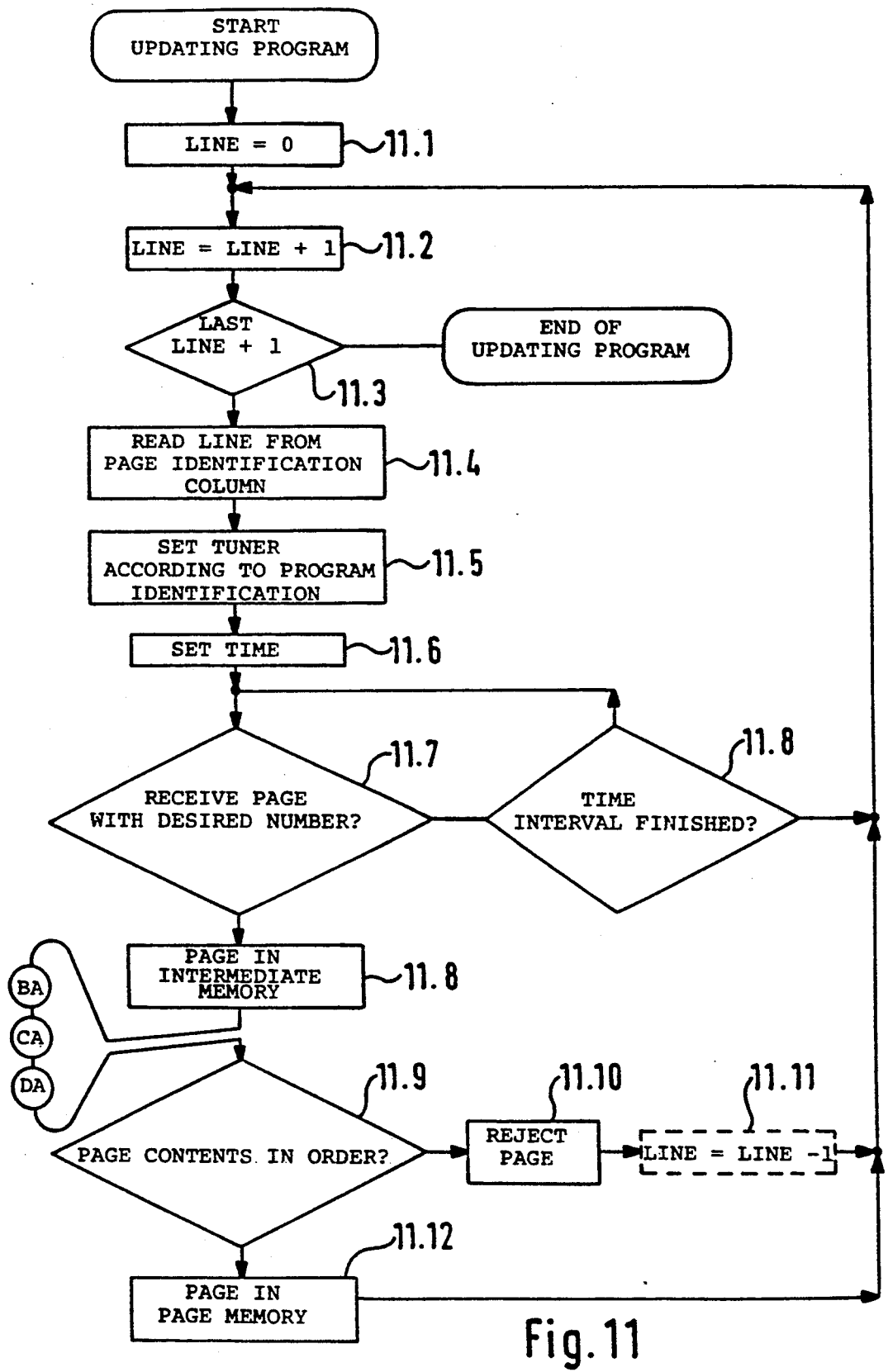
FIG. 11—Flowchart of an updating program for text pages.

FIG. 7 shows the contents of a special list which is created by using the specified steps 3.10′ to 3.13′. In this case, a column containing programme identifications is not required since the full list is called up as such. A mere page identification list of this kind can also be used during the previously mentioned automatic updating (FIG. 11).

Figure 8:
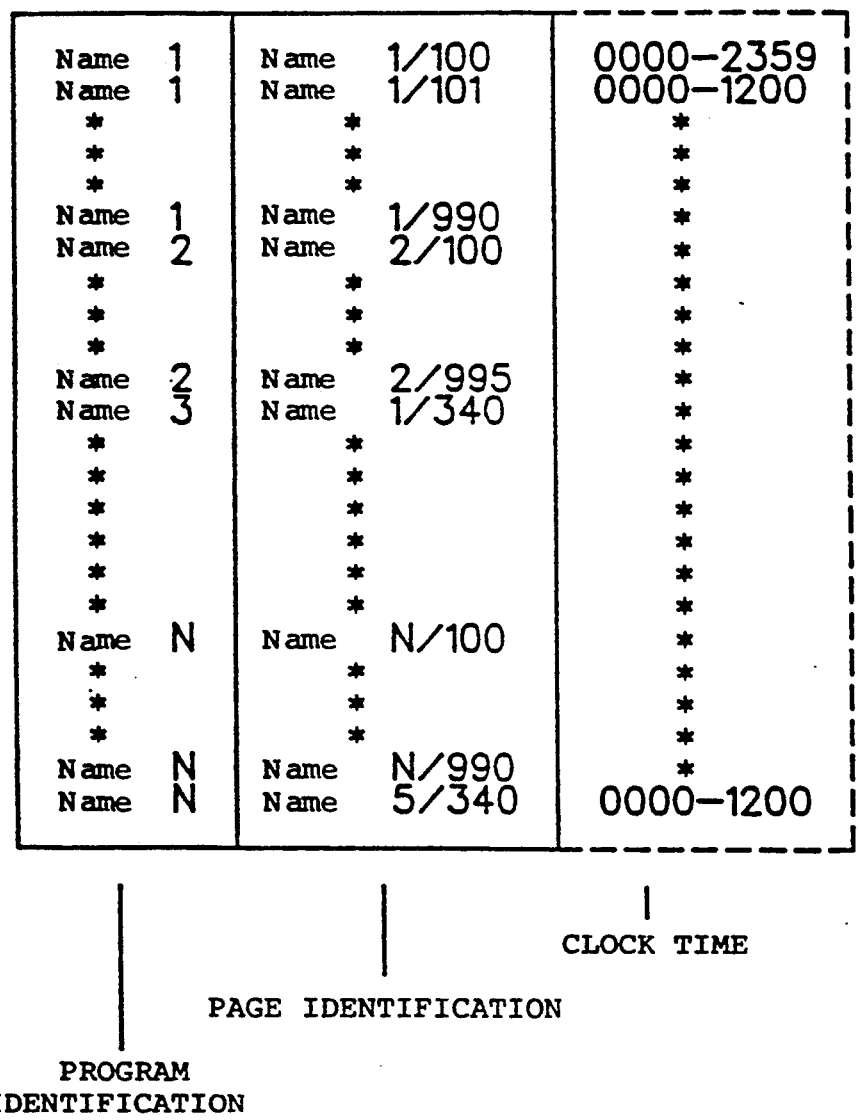
FIG. 8—Display of the content of a programme identification/page identification table.
Figures 9, 10:
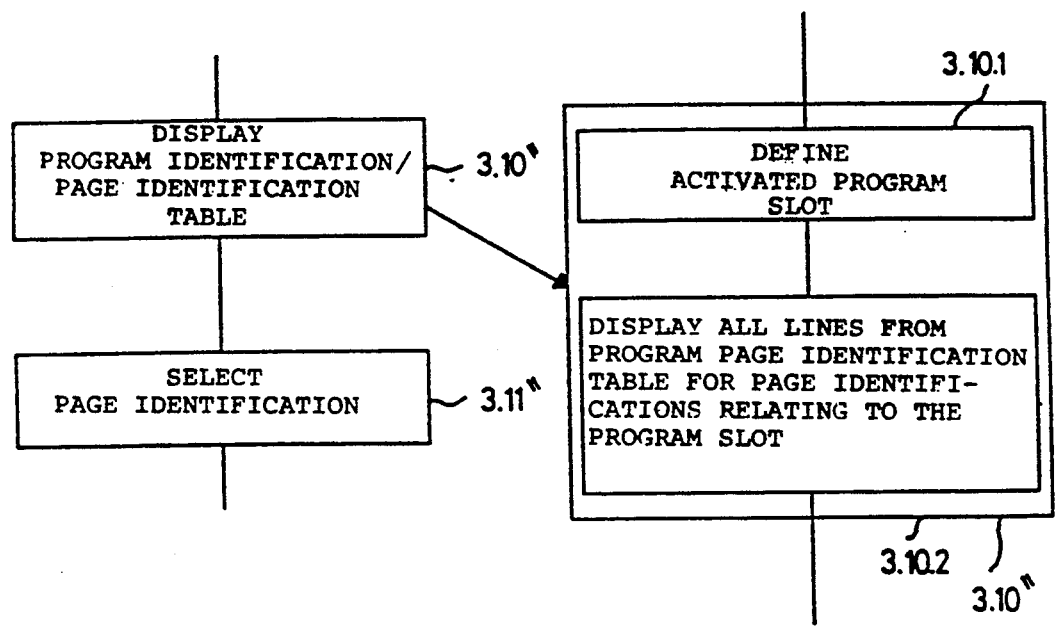
FIG. 9—Variant of steps 3.10 and 3.11 of FIG. 3.
FIG. 10—Variant of steps 3.10" of FIG. 9.

A programme identification/page identification table, as illustrated in FIG. 8, proves beneficial as an input aid when entering page identifications. This list contains for all programmes the pages which provide information regarding broadcasts relating to this programme, and also, in certain circumstances, all or most of the pages for general, subject-related information. In accordance with FIG. 9, in a step 3.10″ instead of step 3.10′ this programme identification table is displayed from which the user selects in a step 3.11″ the page identification for a desired page. The clarity of the display is then increased if step 3.10, is divided into two different substeps 3.10.1 and 3.10.2 as shown in FIG. 10. The activated programme slot is determined initially. Only the section showing the page identifications relating to the programme slot are then displayed from the table corresponding to FIG. 8.

FIG. 1 shows the programme identification/page identification table as part of the ROM. In this case, it cannot be changed and therefore does not offer any further assistance to the user if page numbers relating to specific subjects are being changed by broadcasting stations or new page numbers are being added. If this table can be easily updated, e.g. by means of a dealer service program, it is better to store the table in the EEPROM instead of the ROM.

The programme identification/page identification table may also contain a column for times for the reason explained as per FIG. 6.

The updating programme, which has already been mentioned several times, will now be explained on the basis of FIG. 11. This is used to store text pages in preset intervals in a page memory.

Relatively current pages can then be called up by the user at any time if no text pages are being transmitted or if the tuner cannot be adjusted since a broadcast is being viewed or recorded at that very moment.

In order to update text pages, the tuner must be set each time to receive a specific programme and the text decoder must be supplied with page numbers. This can be carried out by processing the lists, e.g. those shown in FIGS. 4 to 7. Thus, for example, the tuner can be set initially to programme 1 when processing the list corresponding to FIG. 4 and all pages relating to programme 1 are then searched. This process is then carried out for one programme slot after another. If the list corresponding to FIG. 5 is used, a start can also be made with programme 1 and the related page identifications are retrieved. These may contain a page identification which makes retuning necessary. If such a case occurs, either a retune can actually be carried out in order to first retrieve all the pages desired for a certain programme or a search can be made to see whether there are any other page identifications in other programme slots containing the type of programme identification for which the tuner has just been activated. If this is the case, only these pages are retrieved. A switchover to the next programme slot is made only when the procedure is repeated analogously. If lists corresponding to FIGS. 6 or 7 are used, the column containing the page identifications must be processed each time. In this case, line-by-line processing can also be carried out, or a check is made before readjusting the tuner to see whether, on a lower line of the list, there is another page identification whose programme identification is the same as the programme just activated, in which case the relevant page is retrieved before the tuner is adjusted.

For the sake of simplicity, it has been assumed in the programme run shown in FIG. that the lines will be processed in sequence in the corresponding columns of the specified lists. The line number is set at 0 in an initial step 11.1. The line number is then incremented by 1 (Step 11.2) and a check is made to see whether the last line was exceeded by 1. If so, the updating program ends. If the last line has not yet been exceeded, a line from a page identification column is read, whether it is now a column in a programme slot corresponding to FIGS. 4 or 5 or in a list corresponding to FIGS. 6 or 7 (11.4). The tuner is set, depending on the retrieved programme identification (11.5), and then the time is set (11.6) at which the search for a desired page begins. During the search for the page (11.7), a continuous check is made whether the time limit for the search has elapsed (11.8). If the page is found before the time limit expires, the program returns to Step 11.2 in which the page number is increased. If the page has been found, it is stored in a buffer memory (11.8). This storing can be made in the text decoder itself or in the RAM controlled by the control unit. The page is not just transferred to the page memory in order to prevent a correctly stored page from being overwritten by a faulty page. The page stored temporarily is therefore subjected to a plausibility check (Step 11.9) and it is rejected (Step 11.10) if it is not correct. There are various options for the plausibility check. Thus, for particularly important broadcast data, a test number is sent at the same time. In the plausibility check, it is verified whether the data received also contains the test number. For other data, e.g. broadcast titles, for which no test number is transmitted, it can be checked whether the character codes received are plausible. Thus, every title character must be one which is subject to the ASCII Code. If a page has been rejected, the line number can be reduced in a Step 11.11 for it to be at the old value again after the increase in the following Step 11.2 so that a further search is made for the rejected page. If the page is correct, it is stored in a Step 11.12 in the page memory.

During processing of the updating program, the control unit therefore works as an updating device which triggers the tuner and the text decoder on the basis of page identifications, retrieves the desired pages from the broadcast text using the text decoder and stores the page data found in a text page memory device.

The text mode program mentioned during the explanation of FIG. 2 will now be discussed in more detail on the basis of FIG. 12. As soon as the program starts, a menu containing five menu options is displayed (Step 12.1). As soon as a menu option is selected (Step 12.2.), a check is made to see what option was selected. If it is established in a Step 12.3 that broadcasts to be recorded are to be displayed, they are then displayed in a Step 12.4. There then follows a prompt for a modification or a new entry. If nothing is to be modified or reentered, the program returns to a flag AT before the first Step 12.1 so that it can start again. If modifications or new entries are made, these occur in a Step 12.6 to which Step 12.5 is reverted.

If the check in Step 12.3 reveals that broadcasts to be recorded are to be displayed, it is verified whether previously recorded broadcasts are to be displayed (Step 12.7). If this is the case, a Step 12.8, according to which the recorded broadcasts are displayed, is attained via a flag BT. A variant, which improves on this, is explained below on the basis of FIG. 13.

However, reference has already been made to the fact that menu options for displaying either unrecorded or recorded broadcasts are one very beneficial function of a video receiver. Existing video receivers display the total contents of a broadcast memory in a single menu option. This contains either unrecorded broadcasts only, because those already recorded were erased immediately after the end of recording, or the recorded broadcasts are marked with flags so that the user is able to transfer the data relating to the recording to the cassette on which the recording was made. The video receiver equipped with the two menu options mentioned above provide the user with information concerning unrecorded and recorded broadcasts in a particularly clear fashion. In this video receiver, the control unit functions as a retrieval unit for retrieving either flagged or unflagged broadcast information and for displaying the broadcast information on a screen. The control unit also acts as a flagging device for placing flags in the broadcast memory device regarding data for recorded broadcasts. This is explained in further detail below on the basis of FIG. 16.

If either unrecorded or recorded broadcasts are to be displayed, a check is made (Step 12.9) to see whether standard text display should occur. If so, this is displayed after the page identification for the desired page has been entered (Step 12.10). If the retrieved page is a broadcast page, i.e. a text page which contains information relating to broadcasts, this data can be transferred to a broadcast memory device using a cursor in the normal method. In this connection, the line for the desired broadcast is moved by the cursor and then a programming key, preferably the above-mentioned universal key, is pressed.

Programming is performed according to Steps 12.11 to 12.14. These steps are not explained in detail here since the procedure is already known.

If none of the three menu options mentioned above are selected, a check is made in a Step 12.15 to see whether updated text pages are to be displayed. If this is the case, a first page, determined according to specific criteria, is displayed by a Step 12.16. How this page is determined, is explained in further detail below on the basis of FIG. 15. If the determined page is a programme page, Steps 12.11' to 12.14', which correspond to Steps 12.11 to 12.14, can be taken in order to re-program the broadcast memory device using a cursor.

If the selected menu option (Step 12.2.) is not one of the abovementioned menu options, it is certain that manual programming (Step 12.16) is selected. If data relating to a broadcast which is transmitted with a VPS signal is to be entered, this must be entered (Step 12.17). With such a broadcast, only the starting data and the title need be entered (Step 12.18). Otherwise, the finishing data must be entered as well as this data (Step 12.19).

Figure 13:
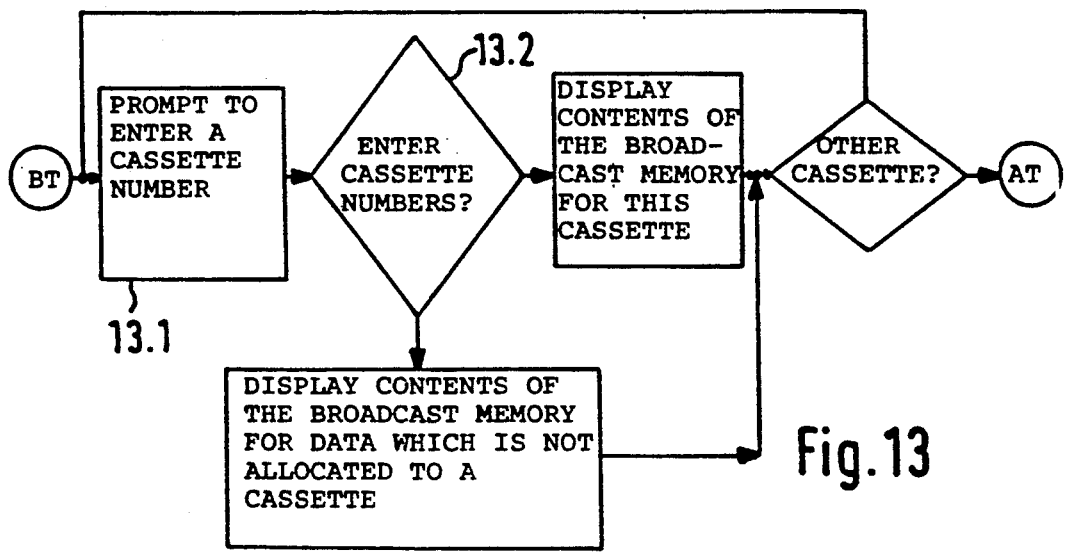
FIG. 13—Flowchart of a variant of the section of the flowchart in FIG. 12 which is connected to the flag BT with the option of transferring broadcast assigned to cassette codes to a broadcast memory device.

During the explanation of the step following Step 12.7 in the program run shown in FIG. 2, it was stated that it is advantageous to interface the program run, according to FIG. 13, from the flag BT in that position.

Figure 16:
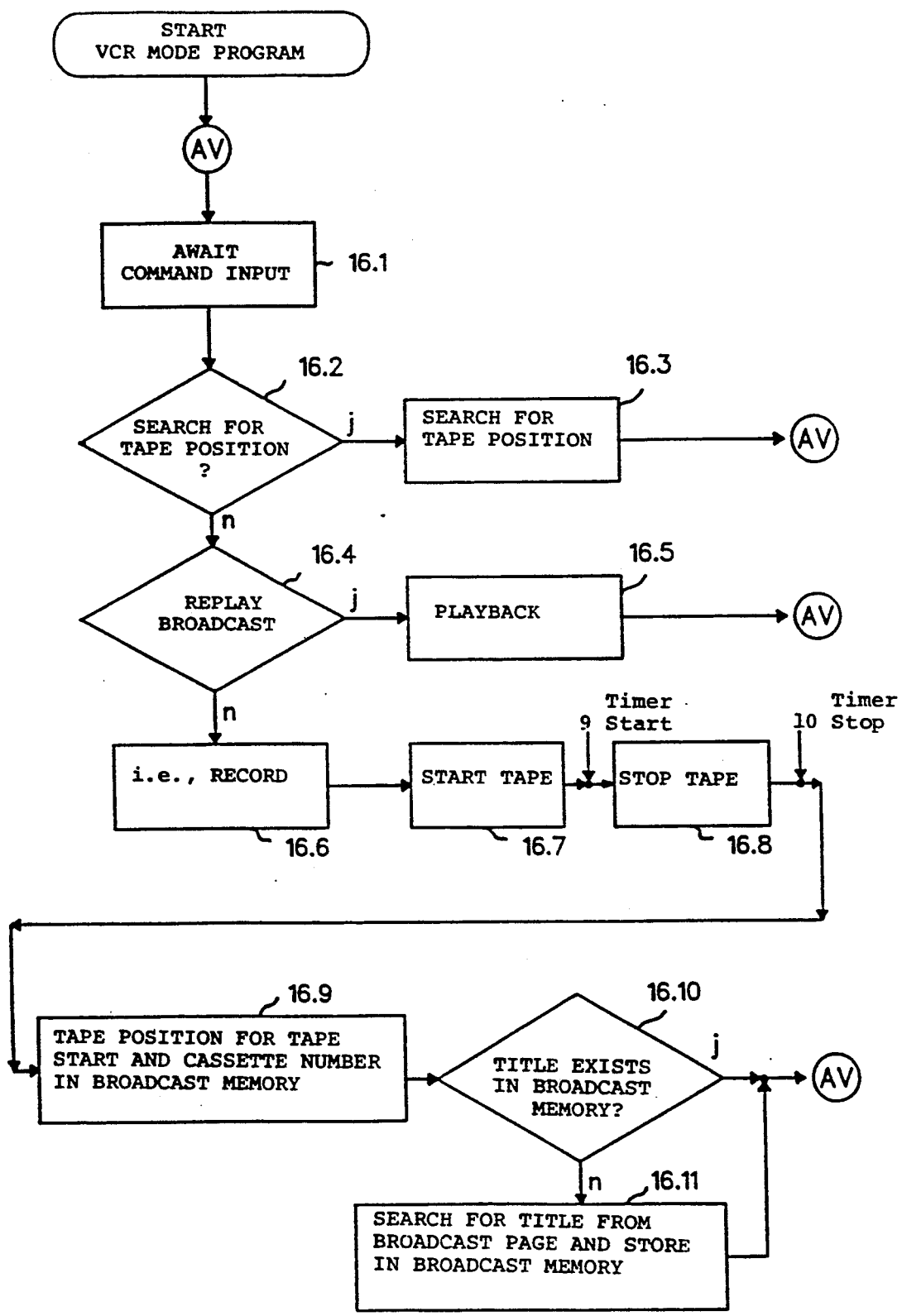
FIG. 16—Flowchart relating to a VCR program with which it is possible to record broadcasts and then enter broadcast data automatically in a broadcast memory device.

In this program run it is assumed that a cassette code is also recorded with the broadcast data relating to each recorded broadcast. In the simplest case, this is a cassette number which is entered by the user at the same time. However, it may also be a code, e.g. a bar code which is read by a code reader when the cassette is inserted. It is now assumed in the following remarks that a cassette number was entered at the time of recording (FIG. 16).

Figure 12:
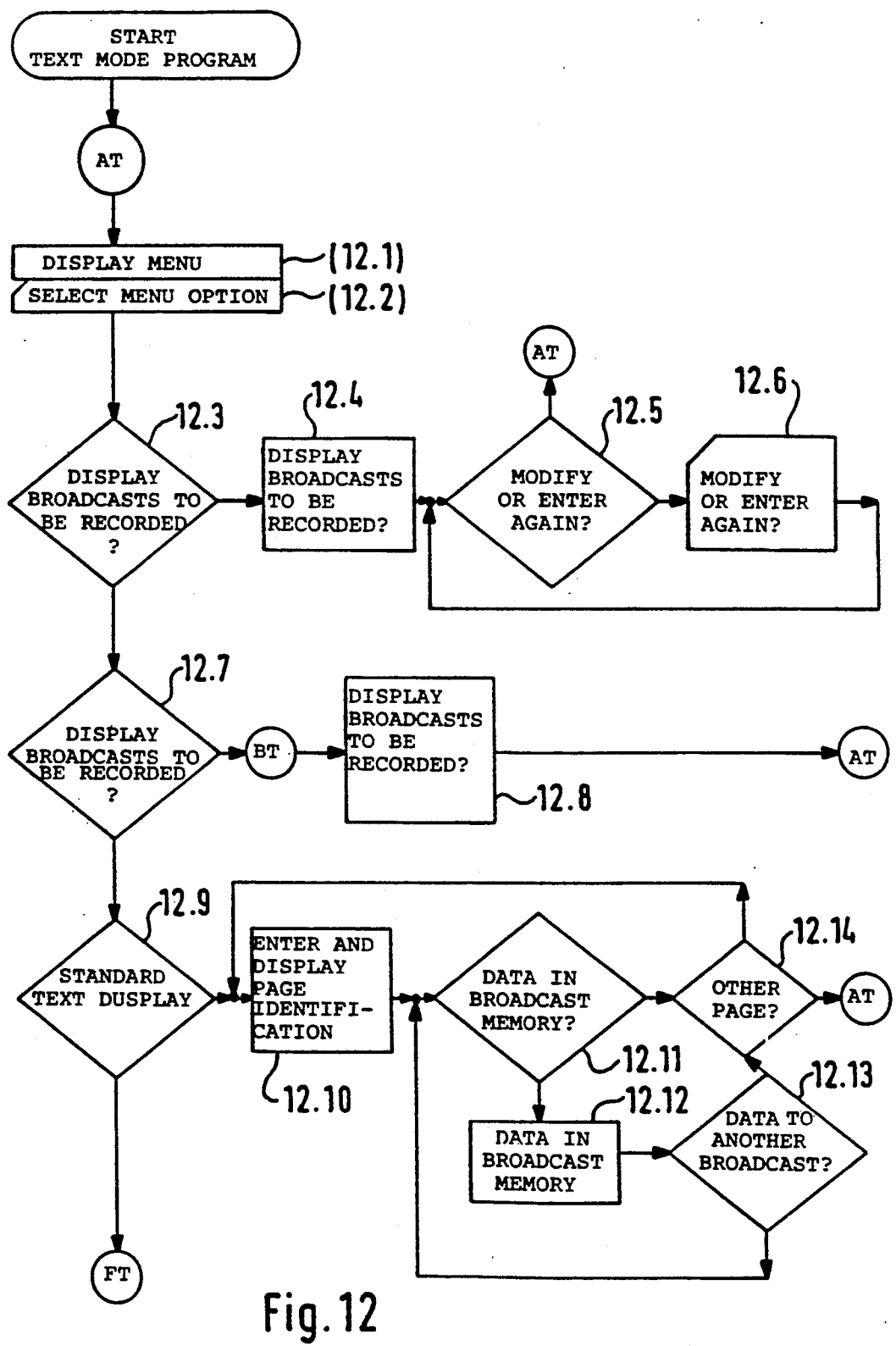
FIG. 12—Flowchart of a program for displaying text pages and for transferring broadcast data to a broadcast memory device.
Figure 12:
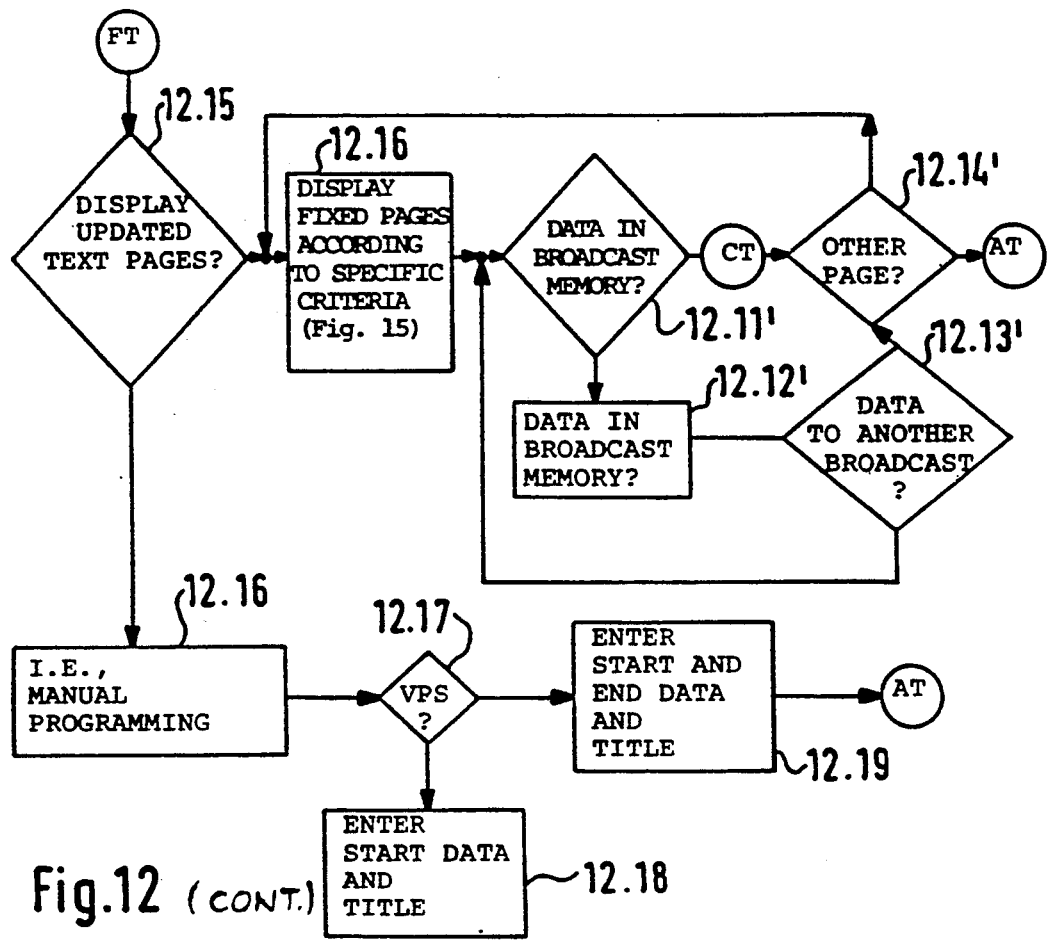

If the user now selects the submenu option "Display recorded broadcasts" during the program run corresponding to FIG. 12, he is prompted in a Step 13.1 to enter a cassette number. If it is ascertained (Step 13.2) that he has obeyed this prompt, the contents of the broadcast memory device for the cassette are displayed with this number.

Thus, extremely simple cassette management is always possible for self-recorded cassettes. In order to obtain an overview of the contents of cassettes, the user need only enter cassette numbers consecutively and study the displayed cassette overview. This overview, as taken from the broadcast memory device, normally contains more information than was noted by the user himself on the cassette. Often only the title of a recorded broadcast and the tape position at which the broadcast begins are noted on the cassette. With several identical titles, the user does not generally have a date to remind him more precisely of the contents of the broadcast. The date and time are, however, stored in a broadcast memory device and can therefore be called up if the memory, as in the case of the working example and different from the state-of-the-art, is a permanent memory. Another advantage is that the broadcast memory device stores the title relating to each broadcast. To assist matters, the individual broadcasts are numbered consecutively and the video receiver is designed so that the user need only enter a broadcast number. The control device automatically searches for the tape position which applies to the corresponding broadcast number with the relevant cassette and selects this tape position. The start position can therefore be found easily when recording by means of flags positioned in the vicinity.

If it is ascertained in Step 13.2 that the user has entered the fact that he is not defining a cassette number, the contents of the broadcast memory device are only displayed for broadcast data which are not allocated to a coded cassette.

Figures 15, 17:
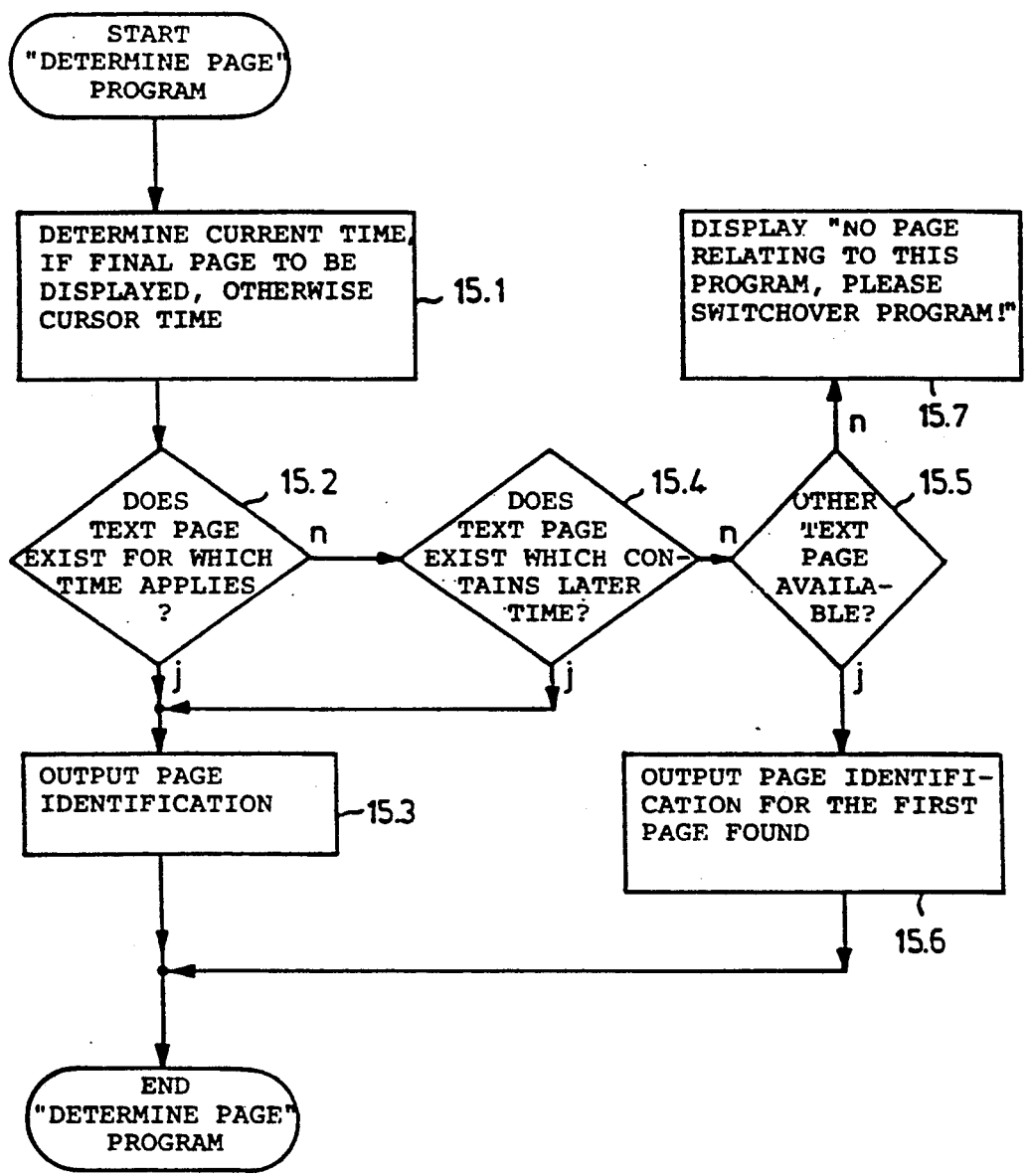
FIG. 15—Flowchart relating to the definition of page numbers when paging through text pages in accordance with the program run in FIG. 14.
FIG. 17—Display of the contents of a screen which displays the contents of a broadcast memory device for an individual cassette.

FIG. 17 is an example for a screen display relating to broadcasts which are recorded on a cassette. The cassette number is displayed together with the consecutive broadcast number, the tape position at which the broadcast begins, the date and time of recording and the title.

Figure 14:
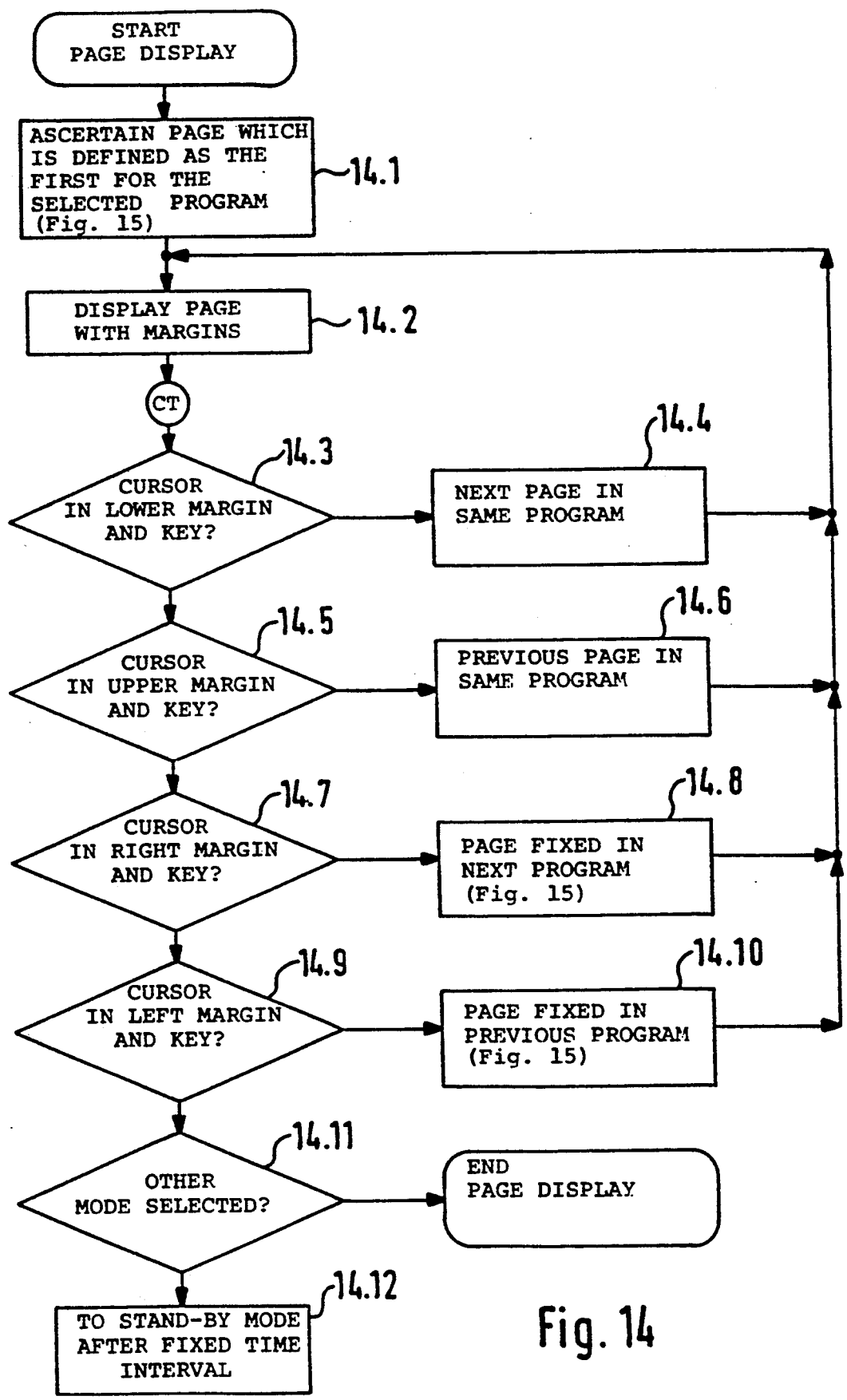
FIG. 14—Flowchart relating to the change of pages during the program run corresponding to FIG. 12.

On the basis of FIG. 14, the following explanation will describe in further detail how the menu option "Display updated text pages" functions more beneficially in the program run corresponding to FIG. 12. Firstly, the page defined as the first for the selected programme is determined. The way in which the page is determined is described in more detail below on the basis of FIG. 15. Once the page is determined (Step 14.1), the page data and a margin are displayed on a screen, i.e. in the normal manner (Step 14.2). These margins are used to increase user-friendliness when switching over from one page to another and from one programme to another. Steps in this respect follow on from a flag CT, which is also marked in FIG. 12, i.e. whenever a page change is involved (Step 12.14').

If a page is displayed on a screen and a cursor control is present, the cursor can be moved up or down from line to line. If the line shift key is held down, the cursor jumps from one line to the next at a specified time cycle.

In the working example corresponding to FIG. 14, the control unit is designed so that it works as a page switchover device which switches to a page with a higher number in the same programme if the cursor is moved to the lower screen margin and a specified key is then pressed, e.g. the positioning key itself for moving the cursor up or down. If the cursor is moved to the lower margin area by holding down a positioning key, the pages are not switched over in the short cycle of the line feed, but only in a longer cycle so that the user has the option of releasing the key or moving the cursor in another direction if he does not actually want to switch over pages. In accordance with FIG. 14, a poll takes place in a Step 14.3 whether the cursor is in the lower margin and, if so, whether a specified key has been pressed. If both conditions apply, a switchover is made to the next page in the same programme (Step 14.4.), i.e. the next page fixed in a page identification list for the same programme is retrieved from the page memory and displayed with margins (Step 14.2).

If the cursor is not in the lower margin, but in the upper margin and the preset key is pressed, this is ascertained in a Step 14.5. The previous page in the same programme is then selected in a Step 14.6. If the cursor is in the right-hand margin and the specified key is pressed, this is ascertained in a Step 14.7. A switchover is then made to the next highest programme slot and a fixed page is selected there (Step 14.8). If, however, the cursor is in the left margin and the fixed key is pressed, this is ascertained in a Step 14.9 and a fixed page in the previous programme is searched (Step 14.10). As already mentioned, the determination of pages on the basis of FIG. 15 is explained in more detail below.

Switching between pages is carried out until another mode is selected which is ascertained in a Step 14.11 or until a fixed time span expires. In this case, the program switches to the stand-by mode. The monitoring step 14.11. must not necessarily run in the page display subprogram, but it can also be carried out in the background program, a fact that already mentioned at the beginning in the description of FIG. 2.

In the flowchart shown in FIG. 12, the flag CT with which the cursor control unit corresponding to FIG. 14 is interfaced, is only marked in the section relating to the display of updated text pages. However, this flag is not present in standard text display. The described cursor control unit could, however, also be used there. The advantage of being able to scroll in pages without any delay no longer applies in this case. There is a delay each time until the cursor has found an adjacent page. If the programme is changed by moving the cursor to the right or left-hand margin and pressing the preset key, the tuner must also be adjusted before a new page can be searched. However, this does not alter the fact that it is very simple with the aid of the margin areas to scroll in pages. If no updating has been carried out, the waiting period can be shortened or even excluded during scrolling so that the displayed page and the four adjacent pages are stored each time in the page memory areas.

With the working example it has been assumed that, when the upper or lower margin area has been reached, the program moves to another page in the same program and that, when a jump is made from one page to another with the aid of the cursor in the right or left-hand margin, the program is changed. This margin allocation can, however, be changed at will. It is only necessary for a picture generator to be present which ensures that the page data has margin areas, that a cursor control unit is present with which the cursor can be moved to the specified margin areas, and that a page shift device ensures that whenever the cursor is moved to a margin area and a preset key is pressed, the program switches to a previously fixed page.

It is preferable to determine a page in the manner shown in FIG. 15. If a menu option, through which pages can be displayed, is reached for the first time, the current time is determined in a Step 15.1. A check is then made to see whether a text page to which the current time applies exists for the activated program (Step 15.2). This search can be carried out in different ways. If only updated pages are to be displayed, it is possible to scan the contents of the stored pages relating to the activated program for the current time and to display the page which contains the current time. If this involves a video receiver without such a memory, or pages are also to be sought which are not stored in the updated page memory, a table must be used which makes an allocation between page identifications and times, i.e. lists as shown in FIGS. 6 and 8. If a text page is found for which the current time applies, the page identification is output (Step 15.3) so that the page to be displayed is therefore determined. However, if no page is found for the current time, a search is made, as already mentioned, for a text page for which a later time applies. If such a page is found (Step 15.4), the page identification is output (Step 15.3). Otherwise, a search is made to see whether any other text page exists for the activated program (Step 15.5). If this is this case, the page identification for the first page found is output (Step 15.6). If no page is found, this is displayed (Step 15.7).

Let us assume that the current time is "10.00 a.m." and that a relevant page exists for the activated program. This is therefore displayed. The user now scrolls through the pages relating to the activated program using a cursor until he reaches a broadcast page for the evening broadcasts. He is now also interested in the evening broadcasts of other programmes. The video receiver corresponding to the example is now characterised by the fact that, as soon as the cursor was moved from the current time to a new time in a broadcast page, it uses this time as the new time span. If the programme is then changed, the current time is no longer defined for establishing the first page to be displayed for this programme in Step 15.1, but the time at which the cursor was positioned in the last displayed broadcast page is ascertained. In the following Step 15.2, a search is made for a text page which applies to this cursor time. As long as the cursor is not moved in a time direction, the cursor time is retained. If the cursor is therefore moved only to the left or to the right, in order to switch over to other programmes, the cursor time does not change if a programme is reached which does not contain a page with the cursor time or a page with any fixed time. Thus the user can easily obtain an overview of what programmes relating to the time selected by him with the cursor are being broadcast and what the titles of these broadcasts are.

The video receiver corresponding to the above example therefore features a page switching device for switching over text pages from one programme to text pages from another programme, whereby the switch-over is made with the aid of the above-mentioned cursor time. In this case, it is irrelevant whether the first entry was made using the current time or whether the first page was selected from a list for the activated program during the initial display. However, it is beneficial to display the page containing the current time as the first page, since a user is often interested in the broadcasts currently being offered by other programmes or when interesting broadcasts are shortly to begin.

If both overview pages and detailed pages in respect of shorter time periods are available for selection on a time basis, it is preferable to page through the pages containing the shortest time selection.

Let us now discuss the program for the third of the three modes available, i.e. the VCR mode. In accordance with the program run shown in FIG. 16, a program step 16.1 is reached via a flag AV and a command input is prompted. A menu is normally displayed in order to facilitate the command input for the user. It is assumed that three menu options are available, i.e. locating a tape position (Steps 16.2. and 16.3), playing back a broadcast (steps 16.4 and 16.5) and recording (Step 16.6.). If a recording is to be made, a record key is pressed in a Step 16.7 to start a tape. Recording may also be started by a timer. Through a manual input in a Step 16.8 or by stopping the timer, the tape can be stopped, thus ending the recording. The tape position at the start of the recording and the cassette number are then transferred to the broadcast memory device. This information is used as a flag to process a recording request. As explained above (re. FIG. 12), it is possible with a good video receiver to display either flagged or unflagged broadcasts in a particularly beneficial manner even according to cassette numbers. If the video receiver cannot distinguish entries according to cassette codes, it is better to erase flagged broadcast data and insert a new cassette in the tape device. The user can then write the flagged broadcast data on his cassette after removing the cassette. As soon as a new cassette is inserted, he no longer sees any broadcasts in the menu option "Display recorded broadcasts" (Step 12.7).

However, if the broadcast memory device is capable of storing cassette codes, broadcast data relating to recorded broadcasts is only erased if this entered by the user or if a broadcast is being totally overwritten.

A further step (Step 16.10) is connected to Step 16.9 in the program run corresponding to FIG. 16. This step is completely independent of the presence of a cassette code and can therefore be used for any video receivers with broadcast memory devices. It is possible in this case to enter titles retrospectively. In Step 16.10, a check is made whether a title is already stored in the broadcast memory device. A title will not actually be present if the user has suddenly decided to record a broadcast without pre-programming the VCR. If no title is present, the video receiver then searches for a title in broadcast pages. The control device acts in this case as a search device which searches for a page containing information for the period in which recording of a broadcast commenced. If a time-related text page is located for the programme whose broadcast was recorded, the time-related broadcast is searched in the page. If this is found, the related title is read and stored in the broadcast memory device. It is very easy then to search for a time-related broadcast if a VPS is also transmitted with the recorded broadcast. Only the broadcast with the corresponding code need then be searched. If no such code exists, the time search must be carried out according to the explanation given for Step 15.1.

When page numbers are entered in a basic programme and a programme is updated, it is assumed that a text page is also transmitted continually for every entered page number. This applies to preview pages, i.e. for text pages with TV programmes, e.g. for tomorrow and the day after tomorrow, but only when the pages for these days always have the same numbering, e.g. the page for tomorrow is always page 401 and the page for the day after tomorrow is always 402. However, in addition to this fixed allocation, allocations on a weekly or monthly basis can be made in practice. In a weekly allocation every preview page has a number which is assigned to a day of the week. For example, every Monday page has the number 401, every Tuesday page the number 402 and so on. The same rule applies to monthly allocation. If a user were now to enter the page numbers 401 to 431 in a monthly allocation, 31 preview pages would be sought every day although a user would hardly be interested in such a long preview. Normally, a user is only interested in a preview of one or two days. With the video receiver described below on the basis of FIGS. 18 to 23, it is possible for the user to receive only pages relating to the desired number of preview days each time. In this case, the user enters the page numbers under which preview times can be found, i.e. for example, page numbers 401 to 431. He also specifies the number of desired preview days, e.g. two days. The unit then searches among the times with the specified numbers for the actual two pages which carry tomorrow's date or the date of the day after tomorrow.

Figures 18, 19:
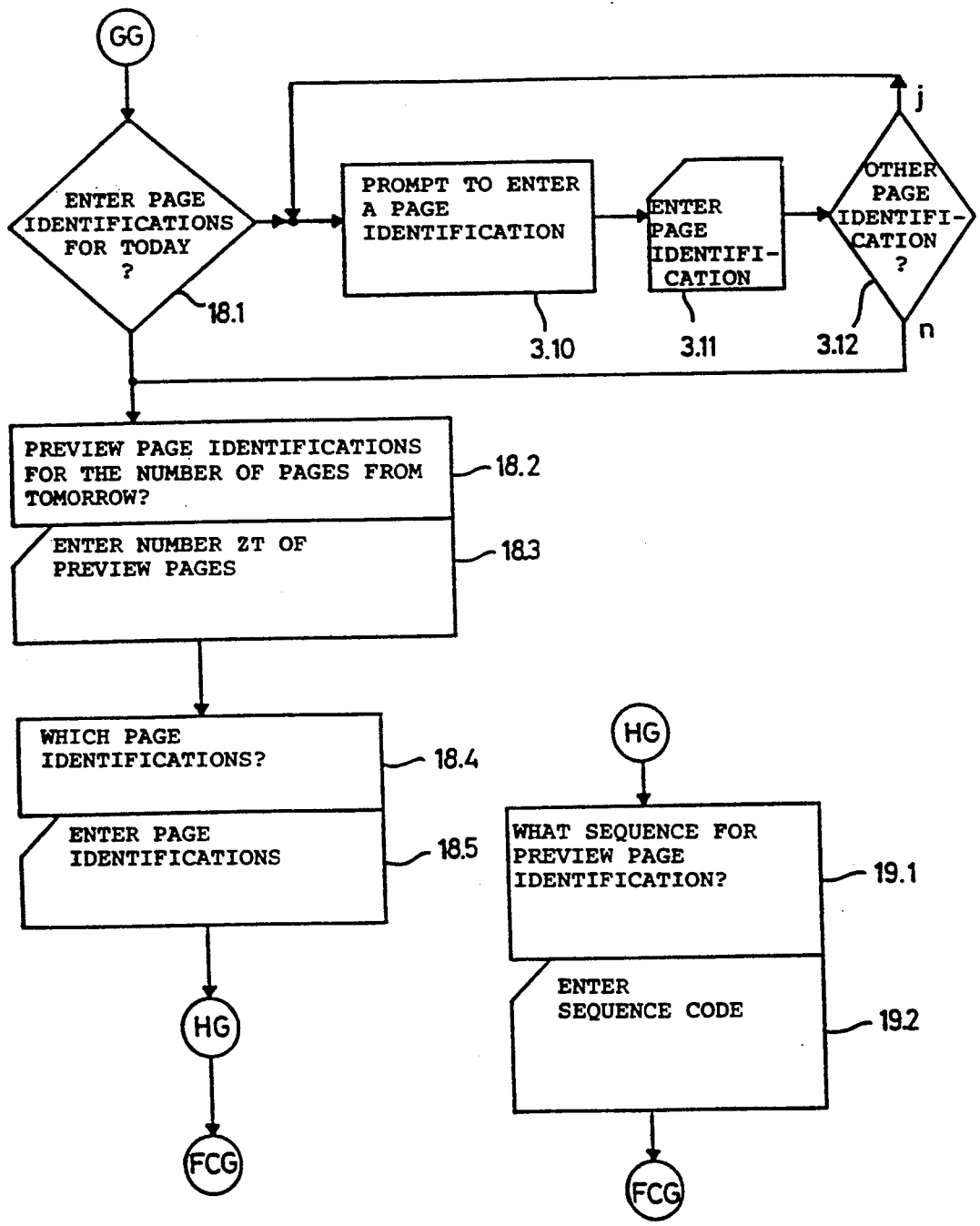
FIG. 18—Flowchart relating to a variant of the basic programming program corresponding to FIG. 3, i.e. for entering data relating to preview pages.
FIG. 19—Flowchart of an addition to the program run corresponding to FIG. 18, for entering a sequence code.

In the program run corresponding to FIG. 18, the user must decide in a Step 18.1 whether he would like to enter page identifications for today. If this is the case, the program continues according to the previously described Steps 3.10 to 3.12. It is emphasised that with a simple program it is possible to enter only page numbers instead of page identifications, i.e. programme identifications and page numbers. The fact that the page identifications entered apply each time to pages for the current date, can be noted in the memory by means of a corresponding code. In the following it is assumed that such a code, if it is present, has the letter "H".

However, if the user decides in Step 18.1 to enter page identifications for preview pages, he is first prompted in a Step 18.2 to enter the number of desired preview days. In a Step 18.3, the user determines the number of preview days. This number is called ZT in the following remarks. This is followed by Steps 18.4 and 18.5 with which the page identifications are entered. As already mentioned, simple time spans, e.g. 401 to 431, can be entered as page identifications. These are then sought in the program which is allocated to the programme slot which was fixed before the Step 18.1 in the basic programme. It must be pointed out that Step 18.1 is interfaced with the flag GG of the basic programming run shown in FIG. 3. If a complete page identification is entered, the relevant page can also be searched in a programme which does not correspond to that allocated to the programme slot.

If the preview pages are not allocated according to the monthly code, other page identifications are entered accordingly, e.g. by using page numbers 601 to 607, for a weekly code. If fixed pages are entered each time for tomorrow or the day after tomorrow, only the number of pages corresponding to the number of desired preview pages is entered. If several pages are transmitted for a particular preview day, more pages must be entered accordingly. The numbers entered depend on how the individual broadcasting station has selected the page numbering. If the video receiver has automatic updating, it is beneficial to also specify in the basic programming how many pages are desired for each preview day. It can then be easily checked how many pages can still be programmed for the page memory.

If only the possible preview pages are entered, the unit must scan all possible pages during each search for pages and separate those which include the preview days, e.g. the pages for tomorrow and the day after tomorrow, if these two preview days are desired. The search can then proceed quicker if the unit is aware of the sequence code according to which the preview pages are assigned. The program run shown in FIG. 19 enables a sequence code to be entered in Steps 19.1 and 19.2. These steps are interfaced to the flag HG in FIG. 18, i.e. to the Step 18.5. The code may, for example, be "M" for monthly, "W" for weekly, "F1" for each preview page tomorrow in a fixed allocation or "F2" for the preview page of the day after tomorrow in a fixed allocation.

The following explains how the device programmed according to the above-mentioned program run searches for pages in the updating program. In FIGS. 11.8 and 11.9 three flags BA, CA and DA are marked. On the basis of FIG. 20 a program run is described which can be inserted between the flags BA and CA. FIG. 21 illustrates a program run which can be positioned between the flags CA and DA. The program run corresponding to FIG. 20 can also be used in accordance with Fig. 21.

Figure 20:
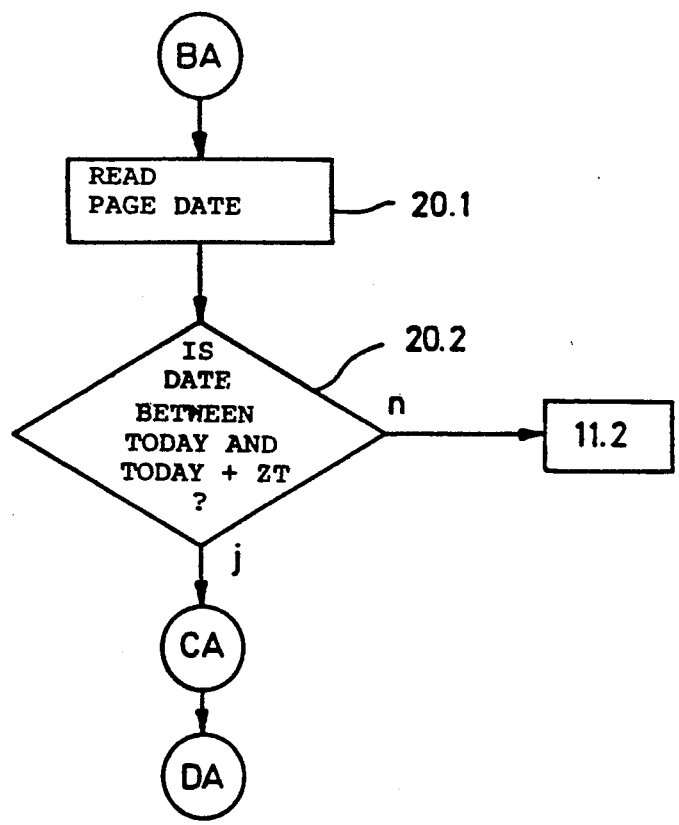
FIG. 20—Variants of an updating program run, in which only those pages are updated whose date is between today and today plus a specified number of days in the future.
Figure 21:
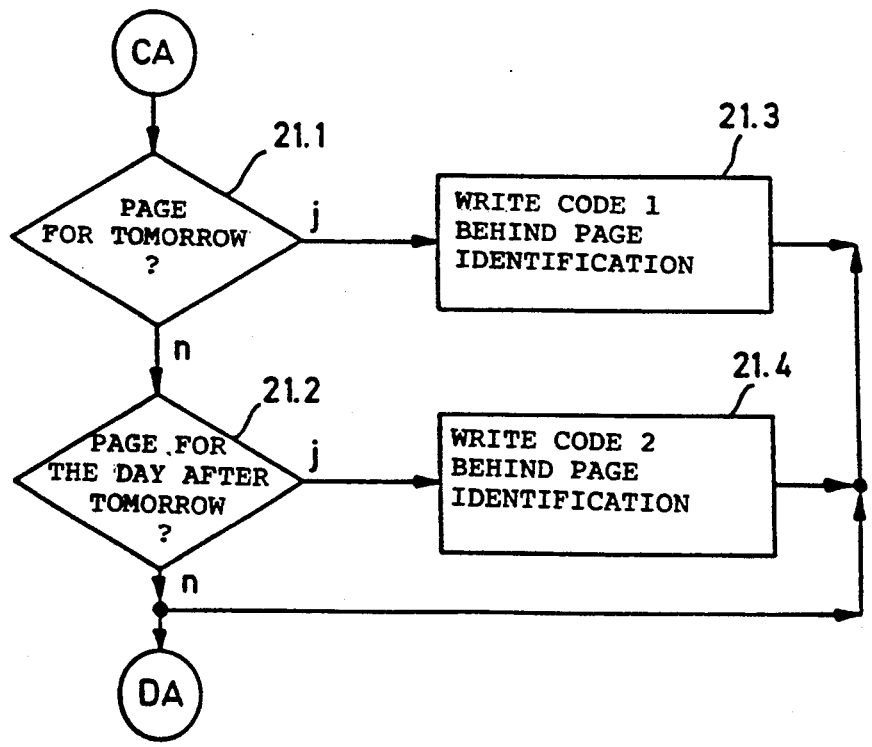
FIGS. 21 and 22—Flowcharts which supplement the program run corresponding to FIG. 11 in order to find preview pages with the aid of a learnt sequence code.

During the program run corresponding to FIG. 20, if a found page is stored in the buffer memory, the date of the page is read in a Step 20.1. In a Step 20.2 it is checked whether this date lies between today and today plus the number ZT of the preset preview pages. If not, Step 11.2 follows according to FIG. 11, i.e. the line number is increased in order to look for a new page. If, however, the page stored in the intermediate memory is located in the specified date area, Step 11.9 follows on with flags CA and DA. In this step it is checked whether the page contents are correct. The program run with Steps 20.1. and 20.2 therefore guarantees that, from the total number of possible pages, only those pages within the preview time are transferred to the page memory device. The memory device may be a permanently updated device, but also one which only stores pages for the programme slot just selected. Thus, text pages which are desired for this programme slot are accessed in real time.

The device finds the search easier when it knows the sequence code under which the respective preview pages can be found. If, for example, the unit knows that Monday allocation prevails and that for each day a page with a fixed number is transmitted, the unit need only search, if the current date is the 22nd of the month, for those page numbers entered for preview which end with the number "23". This is then the page number for the preview for tomorrow.

The sequence code can also be entered in the basic programme. However, it is more advantageous if the device is capable of ascertaining the sequence code itself. The correct pages, e.g. for tomorrow and the day after tomorrow, are then always found even if a broadcasting station changes the page numbering. The actual search method is explained below on the basis of FIGS. 21 to 23.

FIG. 23 shows a variant for an extract from the programme slot memory corresponding to FIG. 5, i.e. for programme slot number 5. Eight page identifications are stored whereby all pages are to be found in the current programme. The page numbers are firstly 301 to 303 for each current day, and 401 to 413 for the preview relating to seven weekdays whereby it is assumed that for each weekday two pages are transmitted. The letter "H" is entered as a sequence code behind the page identifications for each current day. "F1" or "F2" is entered between pages 401 and 403 which means that they are page numbers, which are allocated fixed according to each day tomorrow or the day after tomorrow. This assumption is made here in order to illustrate the learning process for ascertaining the sequence code.

In the case in question, where seven numbers are entered for the preview, it will be more sensible in practice to assume immediately that weekly assignment exists.

Figure 22:
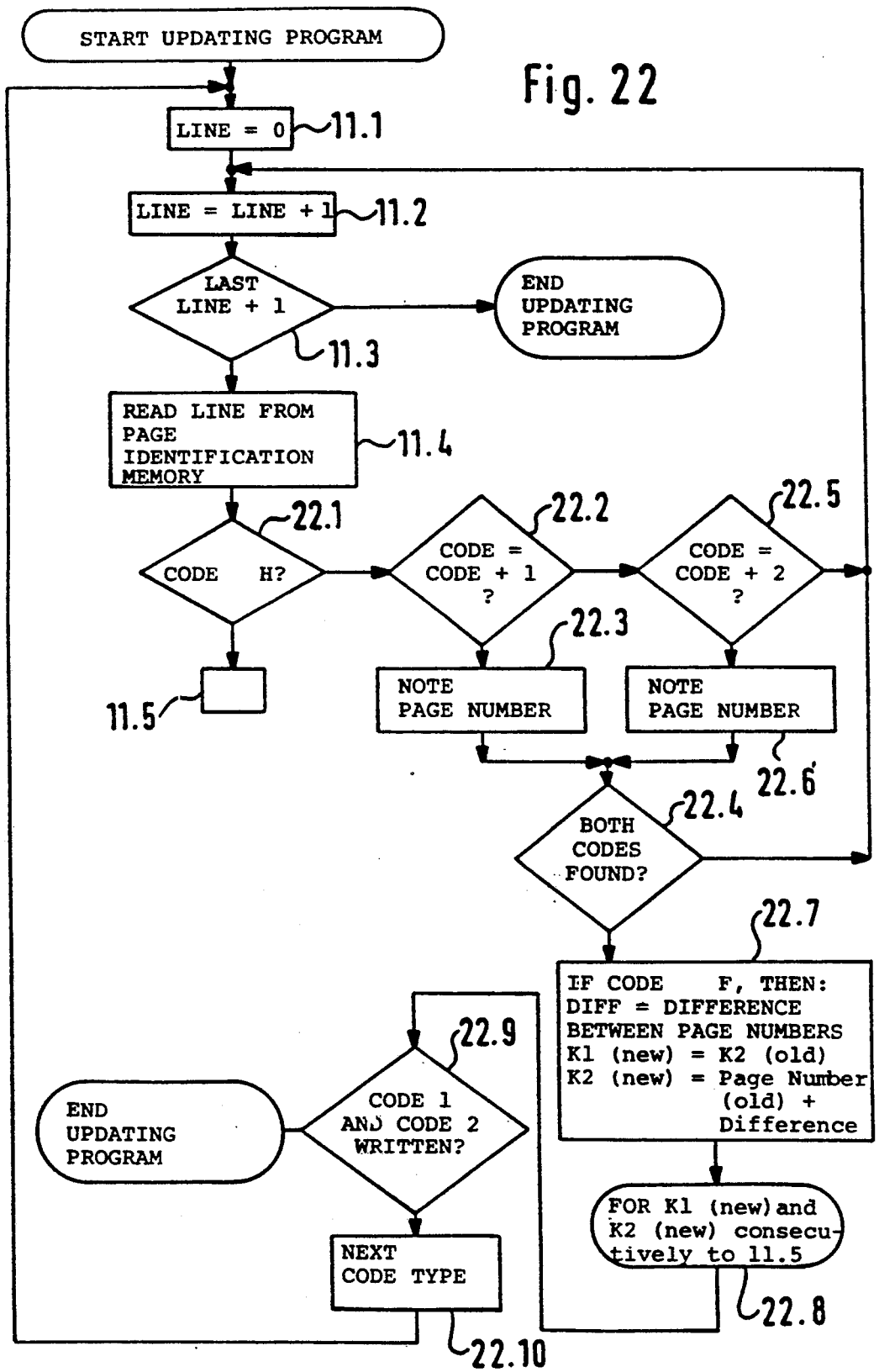

During the explanation of the learning process, as illustrated by the flowcharts in FIGS. 21 and 22, it has already been assumed during the explanation of FIG. 20 that these steps are included in the updating program corresponding to FIG. 11. However, it must be emphasised again that the term "updating program" does not necessarily mean one which updates an extensive page memory continually, so that information can be read from this instead of requiring a realtime interrogation program. To be more precise, the "updating program" can also merely be used to occupy a relatively small page memory with some page contents ascertained in realtime, i.e. for example, always the very pages which are of interest for the current programme and/or with adjacent pages (see explanations regarding "paging" above).

The explanation of FIG. 22 begins with a Step 22.1 which is interfaced with the Step 11.4 of the program run corresponding to FIG. 11. In Step 22.1 it is ascertained whether the sequence code is different to "H". If this is not the case, i.e. the page relates to the present day, the program run follows from Step 11.5 on the basis of FIG. 11. If, however, another code is present, i.e. for example the code "F1", it is ascertained in a Step 22.1 whether a code is present for the following day. A code for the following day carries the number "1" each time while the code for the day after tomorrow has the number "2".

The code in fixed allocation for tomorrow is therefore, as already mentioned, "F1", while the code for tomorrow with a weekly allocation is "W1". The code for the day after tomorrow in monthly allocation would therefore be "M2". If the sequence code is entered correctly in the memory in accordance with FIG. 23, the following happens. In the case of the codes "F1" and "F2", it is immediately clear that a search must only be made for these pages if preview pages for tomorrow and the day after tomorrow are being searched. If the page numbers differ by the difference "2", as for example in FIG. 23, it is assumed that 2 pages are to be searched each time, i.e. pages 401 and 402 for tomorrow and pages 403 and 404 for the day after tomorrow. However, if the sequence code is W1 and W2, it is known that the page number which was noted as "W2" during a search on a current day, is the page on the following day which carries the preview for the following day. It is then coded "W1". The page for the day after tomorrow follows from the page with the new code W1, incremented by the difference of the page numbers which first carried the codes "W2" and "W1". The same principle applies to monthly allocation.

The description regarding FIG. 22 led previously to Step 22.2, according to which the Code "F1" is assigned in the memory corresponding to FIG. 23. The related page number is noted in a Step 22.3. In a Step 22.4 it is checked whether both codes have already been found. If not, the next page is sought. During this search, the program progresses automatically via Steps 22.1 and 22.2 to a Step 22.5 in which it is checked whether the page number found carries the second code.

If not, another page identification is retrieved from the memory. This procedure is carried out until such time as the number with the second code is found. This number is noted in a Step 22.6. In the previously discussed Step 22.4, it now turns out that both codes were found. In a Step 22.7, the explained difference between the page numbers is formed and for the two page numbers ascertained in this way the relevant pages are sought with Steps 11.5, 11.6, 11.7, 11.8, 11.9 and 11.12.in accordance with FIG. 11 and, if found, they are entered in the page memory device. Between the Steps 11.8 and 11.9 are Steps 21.1 and 21.2, i.e. steps between the flags CA and DA, in which it is checked whether the page found each time refers to tomorrow or, alternatively, to the day after tomorrow. If it is a page for tomorrow, the new code with the FIG. 1 is written behind the related page identification in the memory according to FIG. 23. This is carried out in a Step 21.3. However, if the page refers to the day after tomorrow, the corresponding code is written in a Step 21.4 behind the page identification for the found page.

It must be pointed out that the code change in Step 22.7 can only be carried out if no fixed allocation exists, i.e. weekly or monthly code.

If, in Steps 22.2 and 22.5, the first or second code has been found and this code was perhaps changed according to Step 22.7, but these codes did not agree, as assumed in the example, no pages for tomorrow or the day after tomorrow are found in Steps 21.1 or 21.2 for the specified codes.

In this case, the codes can also not be re-written according to Steps 21.3 and 21.4. Whether both the codes were written, is checked in a Step 22.9 which is interfaced with the above-mentioned page search program. This page search feature is illustrated in the program run corresponding to FIG. 22 in a Step 22.8. If it is revealed during the search corresponding to Step 22.9 that both codes were written, the updating program ends. In the example, in which the initially entered codes "F1" and "F2" are entered, they are therefore retained at first in Step 22.7, but no codes could be written, since no pages were written for the assigned date on account of the fixed allocation. In a Step 22.10 the type of code is then changed according to a preset method, i.e. for example a search is now made for a weekly code. Thus all pages specified for the preview are scanned and as soon as the page is found which gives a preview for the programme tomorrow, the code "W1" is entered behind this page. If the page with the contents for the day after tomorrow is found, this page receives the code "W2" If on the next day a search is made again for the preview pages, the described program run is carried out as from Step 22.1 whereby new codes are correctly allocated in Step 22.7. The new codes W1 and W2 are written in the display corresponding to FIG. 23 in addition to the memory contents shown there. With every day both identifications move forward by one line. If the last line is reached, the program skips again with one identification to the first page. Thus the video receiver recognises the page numbers applying each time to preview pages by means of the codes behind the page identifications and by means of the algorithm corresponding to Step 22.7.

If, in the example, a monthly sequence code was used instead of a weekly one, the incorrect assignment of the sequence code is established whenever the program skips back to the beginning of the list, since it is assumed the week has ended, but this return is valid as the page identification list would have to be processed further to higher lines on account of monthly allocation.

With the video receiver corresponding to the example, the following, as yet unknown functions can be realised jointly and they can be used in their basic working forms, but also all individually:

If the control device of the video receiver works as an updating device, updated pages are stored permanently in a memory device. These pages can also be accessed whenever a broadcast is viewed or recorded;

if the control device is designed as a page identification/retrieval device, which can access page identifications independently of a programme slot just activated, it is possible to display subject-related pages for each programme slot selected or those pages which actually contain broadcast information for the programme relating to this programme slot, but which are transmitted by other programmes;

if the video receiver has a programme identification/page identification table, the user can be assisted during programming by means of a display of page identifications that can be input. The table can also be used in a corresponding design to support time allocations in relation to text pages;

if the video receiver has a picture generator which marks text pages with a margin, and the control device functions as a page switchover device whose function depends on this, text pages can be paged in a very user-friendly manner;

if the video receiver has a control device which switches over pages on a time-related basis, the user can page through all programmes to a fixed time line, i.e. the first page displayed each time for every programme is the page in whose time span a set time occurs. The time can be set by using a cursor or another command input, e.g. a keyboard;

if the video receiver is equipped with a control device which functions as a broadcast data retrieval device for retrieving either unflagged or flagged broadcast data and displaying the relevant data on screen, the unrecorded and recorded broadcasts can be displayed very clearly. If a cassette code input device is also available, i.e. for example a code reader or a numbered keyboard, flagged data can be retrieved depending on cassettes. This enables cassettes to be administered, i.e. the user is always shown the contents of a cassette whenever he selects a corresponding display menu option and the code for a relevant cassette is present;

if the video receiver has a control device which acts as a title search device, it is possible to automatically enter the title of a recorded broadcast in a broadcast memory device;

if the video receiver has a preview day memory device and a page search device, in addition to a page identification memory device, it is possible to find a limited number of preview pages automatically whenever the pages for a specific preview day, e.g. tomorrow, do not have a fixed number. If the unit also has a learning device, it is therefore capable of learning itself under what page identifications the preview pages for the preview days can be found each time.

I claim:

1. Video receiver, characterised by
   a tuner which is adjustable to a preset TV programme by means of programme identification signals,
   a text decoder which can be driven by page number signals for decoding text data when it is transmitted in TV signals, arranged according to pages,
   a programme identification/page number memory device for storing programme identifications and page numbers,
   a text page memory device for storing decoded text page data, and
   an updating device (CPU),
      for the automatic driving of the tuner depending on programme identifications which are retrieved in a specified sequence from the programme identification/page number memory device,
      for the automatic driving of the text decoder depending on page numbers which are retrieved in the specified sequence from the programme identification/page number memory device,
      for the automatic retrieval of text page data from a TV signal, according to the settings of the tuner and text decoder, and
      for the automatic storage of such text page data in the text page memory device.

2. Video receiver, in accordance with claim 1, characterised in that the updating device (CPU) further functions as a test device (CPU) for testing the plausibility of the decoded text page data for a text page and for storing the text page data in the text page memory device, but only if the plausibility condition is fulfilled.

3. Video receiver, characterised by
   a tuner which is adjustable to a preset TV programme by means of programme identification signals,
   a text decoder which can be driven by page number signals for decoding text data when it is transmitted in TV signals, arranged according to pages,
   a page selector device for selecting a text page by setting the tuner and text decoder, depending on a specific programme identification and a specific page number,
   a programme slot selection device for updating one of several programme slots at a time,
   a page identification memory device for storing page identifications, each of which comprises a programme identification and a page number, and
   a page identification retrieval device (CPU)
      for retrieving page identifications, irrespective of the programme slot, and
      for outputting each page identification retrieved to the tuner and decoder,
      whereby, depending on each programme identification retrieved at the same time as the page identification, such pages can also be selected, but whose programme identification is not identical with the programme identification of the activated programme slot.

4. Video receiver, characterised by a tuner which is adjustable to a preset TV programme by means of programme identification signals, a text decoder which can be driven by page number signals for decoding text data when it is transmitted in TV signals, arranged according to pages, and a programme identification/page identification table, which stores at least one page identification, assigned to one of several programme identifications in each case, whereby each page identification comprises one programme identification and one page number.

5. Video receiver, characterised by a tuner which is adjustable to a preset TV programme by means of programme identification signals, a text decoder which can be driven by page number signals for decoding text data when it is transmitted in TV signals, arranged according to pages, a picture generator for producing cursor symbol data for a cursor and picture page data from the decoded text page data and for outputting decoded picture data, either from a text page memory device or direct from the text decoder, to a screen whereby the picture data to be displayed is such that every text page is surrounded by a margin on all four edges when displayed, a cursor control device for positioning the cursor within the field of the picture to be displayed and for triggering specific procedures when a preset key is pressed, and a page switchover device, for switching over to a page of a higher number when the cursor is positioned in the first of the four picture margins and then the preset key is pressed, for switching over to a page of a lower number when the cursor is positioned in the second of the four picture margins and then the preset key is pressed, whereby the second picture margin runs parallel to the first picture margin, for switching over to a programme of a higher number and from there to a specified page number when the cursor is positioned in the third of the four page margins and then the preset key is pressed, whereby the third picture margin runs at a right-angle to the first picture margin, and for switching over to a programme of a lower number and from there to a specified page number when the cursor is positioned in the fourth of the four picture margins and then the preset key is pressed, whereby the fourth picture margin runs parallel to the third picture margin.

6. Video receiver, characterised by a tuner which can be set to a preset TV programme by means of programme identification signals, a text decoder which can be driven by page number signals for decoding text data when it is transmitted in TV signals, arranged according to pages, a picture generator for producing cursor symbol data for a cursor and picture page data from the decoded text page data and for outputting decoded picture data, either from a text page memory device or direct from the text decoder, to a screen, a cursor control device for positioning the cursor within the field of the picture to be displayed and for triggering specific procedures when a preset key is pressed, and a page switchover device, for switching over text pages from one programme to text pages from another programme, whereby, if broadcast pages are present as text pages containing time information, the first broadcast page selected in a programme attained by switching over is that which contains the information in the period in which that time occurs corresponding to respective time information at which the cursor is displayed in the broadcast page before switchover to text pages from another programme.

7. Video receiver, in accordance with claim 6, characterised by the fact that the page switchover device is designed so that, when it first switches over to a page, it selects the broadcast page which contains the information in the time domain in which that time occurs.

8. Video receiver, characterised by a tuner which is adjustable to a preset TV programme by means of programme identification signals, a tape device for recording TV signals received via the tuner, a broadcast memory device to store recorded broadcasts, a flagging device to place flags in the broadcast memory device at the data for recorded broadcasts, and a broadcast data retrieval device to retrieve either only flagged or only unflagged broadcast data and to display the relevant broadcast data on a screen.

9. Video receiver, in accordance with claim 8, characterised by the fact that a cassette identification input device is available for entering a cassette code for every cassette in the broadcast memory device, assigned to each broadcast which is recorded whilst the cassette is in the tape device, the broadcast memory device permanently stores the broadcast data which is provided with a cassette code, and the broadcast data retrieval device retrieves the flagged broadcast data which refers to an entered cassette code.

10. Video receiver, characterised by a tuner which can be set to a preset TV programme by means of programme identification signals, a text decoder which can be driven by page number signals for decoding text data when it is transmitted in TV signals, arranged according to pages, a tape device for recording TV signals received via the tuner, a broadcast memory device to store recorded broadcasts, and a search device for checking whether broadcast information relating to a recorded broadcast is already stored in the broadcast memory device and if this is not the case, for searching for a text page which contains broadcast information for that time span applying to the recorded broadcast, for searching for the time-based broadcast information relating to the recorded broadcast within a located text page, and for storing the located broadcast information in the broadcast memory device.

11. Video receiver, characterised by a tuner which is adjustable to a preset TV programme by means of programme identification signals, a text decoder which can be driven by page number signals for decoding text data when it is transmitted in TV signals, arranged according to pages, a programme identification/page number memory device for storing programme identifications and page numbers, a text page memory device for storing decoded text page data, a preview day memory device for storing a preset number of previewing days for text pages for at least one programme, and a page search device for the automatic driving of the tuner depending on programme identifications which are retrieved in a specified sequence from the programme identification/page number memory device, for the automatic driving of the text decoder depending on page numbers which are retrieved in a specified sequence from the programme identification/page number memory device, for the automatic retrieval of text page data from a TV signal, according to the settings of the tuner and text decoder, and for the automatic storage of such text page data in the text page memory device if the date of each page that is located falls within the period of the previewing days.

12. Video receiver, in accordance with claim 11, characterised by the fact that a sequence code memory device is available which stores a page number depending on the code laid down for each preview day, the page search device only accesses those pages which comply with the sequence code.

13. Video receiver, in accordance with claim 12, characterised by a learning device which attempts to locate a preview page depending on one of several specified sequence codes and which, if it fails to locate preview pages depending on a selected sequence code then, switches to a new sequence code and performs this operation until such time as it locates preview pages depending on the specified sequence codes at the first attempt.

* * * * *